United States Patent
Luo et al.

(10) Patent No.: US 11,164,353 B2
(45) Date of Patent: Nov. 2, 2021

(54) LAYERING OF POST-CAPTURE PROCESSING IN A MESSAGING SYSTEM

(71) Applicant: Snap Inc., Santa Monica, CA (US)

(72) Inventors: Jean Luo, Los Angeles, CA (US); Oleksandr Grytsiuk, Marina del Rey, CA (US); Chenguang Liu, Los Angeles, CA (US); Oleksii Gordiienko, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/732,051

(22) Filed: Dec. 31, 2019

(65) Prior Publication Data

US 2021/0201545 A1    Jul. 1, 2021

(51) Int. Cl.
  *G06T 11/60*  (2006.01)
  *G06T 1/20*  (2006.01)
  *H04L 12/58*  (2006.01)
  *G06T 5/50*  (2006.01)

(52) U.S. Cl.
  CPC ............... *G06T 11/60* (2013.01); *G06T 1/20* (2013.01); *G06T 5/50* (2013.01); *H04L 51/063* (2013.01); *H04L 51/10* (2013.01); *H04L 51/32* (2013.01)

(58) Field of Classification Search
  CPC ... G06T 1/20; G06T 5/50; G06T 11/60; H04L 51/063; H04L 51/10; H04L 51/32
  See application file for complete search history.

(56) References Cited

U.S. PATENT DOCUMENTS

| | | |
|---|---|---|
| 8,752,113 B1 | 6/2014 | Good et al. |
| 2013/0083215 A1 | 4/2013 | Wisniewski |
| 2016/0061623 A1 | 3/2016 | Pahwa et al. |
| 2017/0032577 A1 | 2/2017 | Smith et al. |
| 2017/0352092 A1 | 12/2017 | Mitchell et al. |
| 2018/0060263 A1 * | 3/2018 | Radhakrishnan ... G06F 13/4265 |
| 2018/0143748 A1 | 5/2018 | Ahmed et al. |
| 2019/0066365 A1 * | 2/2019 | Schmalstieg ........... G06T 15/80 |
| 2019/0190865 A1 * | 6/2019 | Jeon ................... G06K 9/00228 |
| 2019/0332522 A1 | 10/2019 | Leydon et al. |

(Continued)

FOREIGN PATENT DOCUMENTS

| WO | WO-2013133895 A1 | 9/2013 | |
|---|---|---|---|
| WO | WO-2018/147741 A1 * | 8/2018 | ........ H04M 1/72555 |

OTHER PUBLICATIONS

"U.S. Appl. No. 16/732,001, Final Office Action dated Jan. 7, 2021", 9 pgs.

(Continued)

*Primary Examiner* — Jeffery A Brier
(74) *Attorney, Agent, or Firm* — Schwegman Lundberg & Woessner, P.A.

(57) ABSTRACT

Systems and methods described herein provide for retrieving, from a storage device, first image data previously captured by a client device. The systems and methods further detect a selection of a first image processing operation and perform the first image processing operation on the first image data to generate second image data. The systems and methods further detect a selection of a second image processing operation and perform the second image processing operation on the second image data to generate third image data. The systems and methods generate a message comprising the third image data.

16 Claims, 31 Drawing Sheets

(56) References Cited

U.S. PATENT DOCUMENTS

2019/0379617 A1    12/2019  Luo et al.
2020/0090246 A1     3/2020  Goyal et al.
2021/0065454 A1     3/2021  Goodrich et al.

OTHER PUBLICATIONS

"U.S. Appl. No. 16/732,001, Non Final Office Action dated Jun. 26, 2020", 7 pgs.
"U.S. Appl. No. 16/732,001, Response filed Sep. 28, 2020 to Non Final Office Action dated Jun. 26, 2020", 10 pgs.
"U.S. Appl. No. 16/732,001, Notice of Allowance dated May 28, 2021", 6 pgs.
"U.S. Appl. No. 16/732,001, Response filed May 7, 2021 to Final Office Action dated May 7, 2021", 12 pgs.
"U.S. Appl. No. 16/732,025, Non Final Office Action dated Mar. 22, 2021", 12 pgs.
"U.S. Appl. No. 16/732,040, Non Final Office Action dated Apr. 20, 2021", 10 pgs.
"International Application Serial No. PCT/US2020/070923, Invitation to Pay Additional Fees dated Apr. 6, 2021", 11 pgs.

\* cited by examiner

LAYERING OF POST-CAPTURE PROCESSING IN A MESSAGING SYSTEM

BACKGROUND

With the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
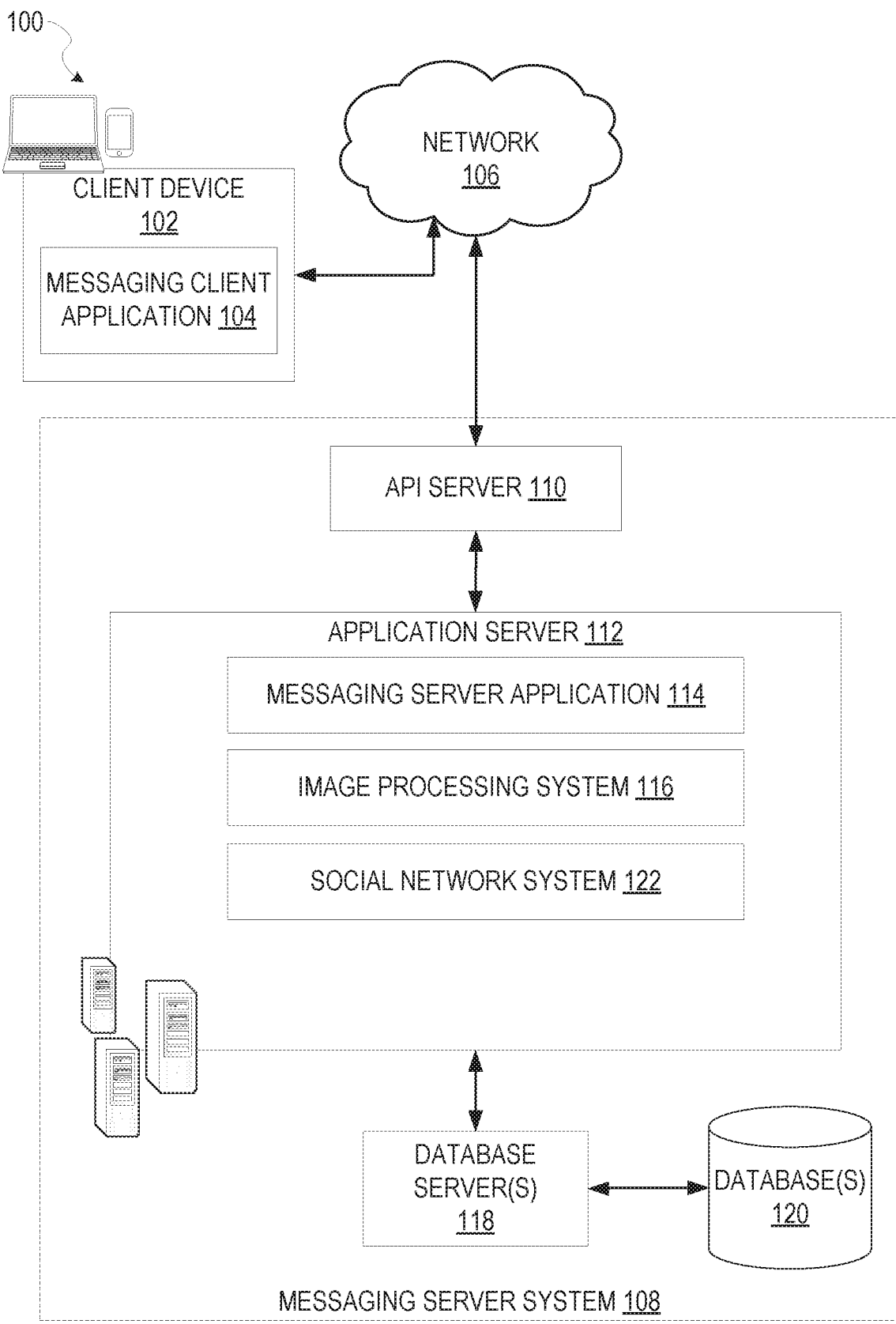
FIG. 1 is a diagrammatic representation of a networked environment in which the present disclosure may be deployed, in accordance with some example embodiments.

As mentioned above, with the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive. Embodiments described herein provide for an improved system for image processing during a post-capture stage of image data or media content.

As referred to herein, a post-capture stage refers to a period where media content has been captured by a given device (e.g., using a capture sensor such as a camera) and has been stored in a given storage device and/or persistent memory device. Further such media content may have undergone transcoding and/or compression to transform the media content into a suitable format for storage. A user of a messaging client application, as described further herein, can retrieve the stored media content at a later time period for applying a set of post-processing image operations described further herein, which advantageously utilizes the novel graphical processing pipelines, systems, methods, techniques, and user interfaces as described in more detail herein.

Messaging systems are frequently utilized and are increasingly leveraged by users of mobile computing devices, in various settings, to provide different types of functionality in a convenient manner. As described herein, the subject messaging system comprises practical applications that provide improvements in rendering media overlays on media content (e.g., images, videos, and the like) by at least performing post-processing operations on the media content. Such post-processing operations are enabled by at least an extensible graphical rendering pipeline software architecture (as described further herein) which supports layering of post-processing operations to provide composite media content. Via such an extensible architecture, processing and computing improvements can be achieved over existing graphical rendering pipelines. The extensible architecture can further reduce latency in rendering of the post-processing operations compared with image processing operations that are performed in conjunction with image and/or video capture operations (e.g., via a camera of a given electronic computing device).

As referred to herein, the phrase "media overlay" or "media overlays" includes various image processing operations corresponding to an image modification, filter. LENSES, and the like, as described further herein.

FIG. 1 is a block diagram showing an example of a messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
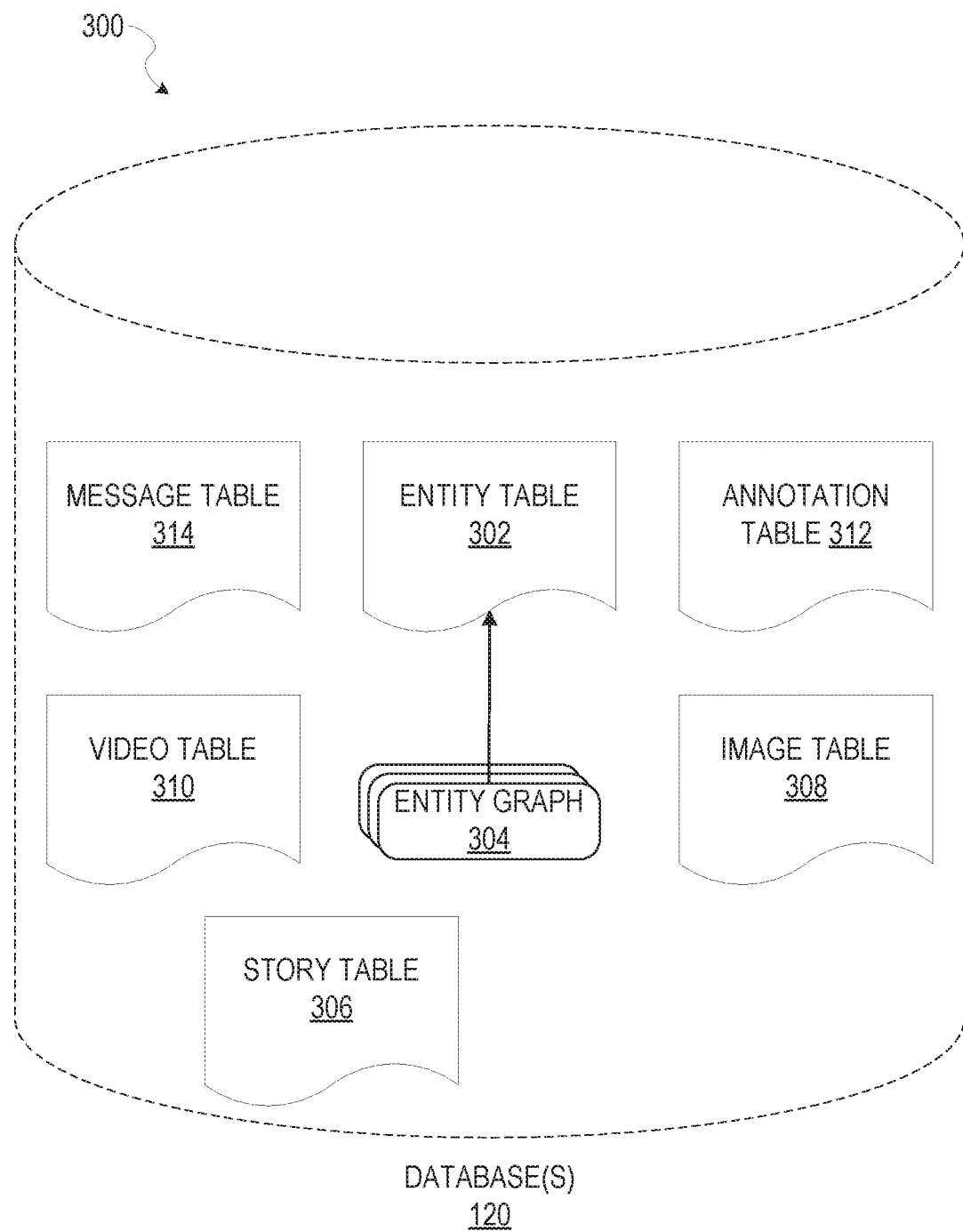
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
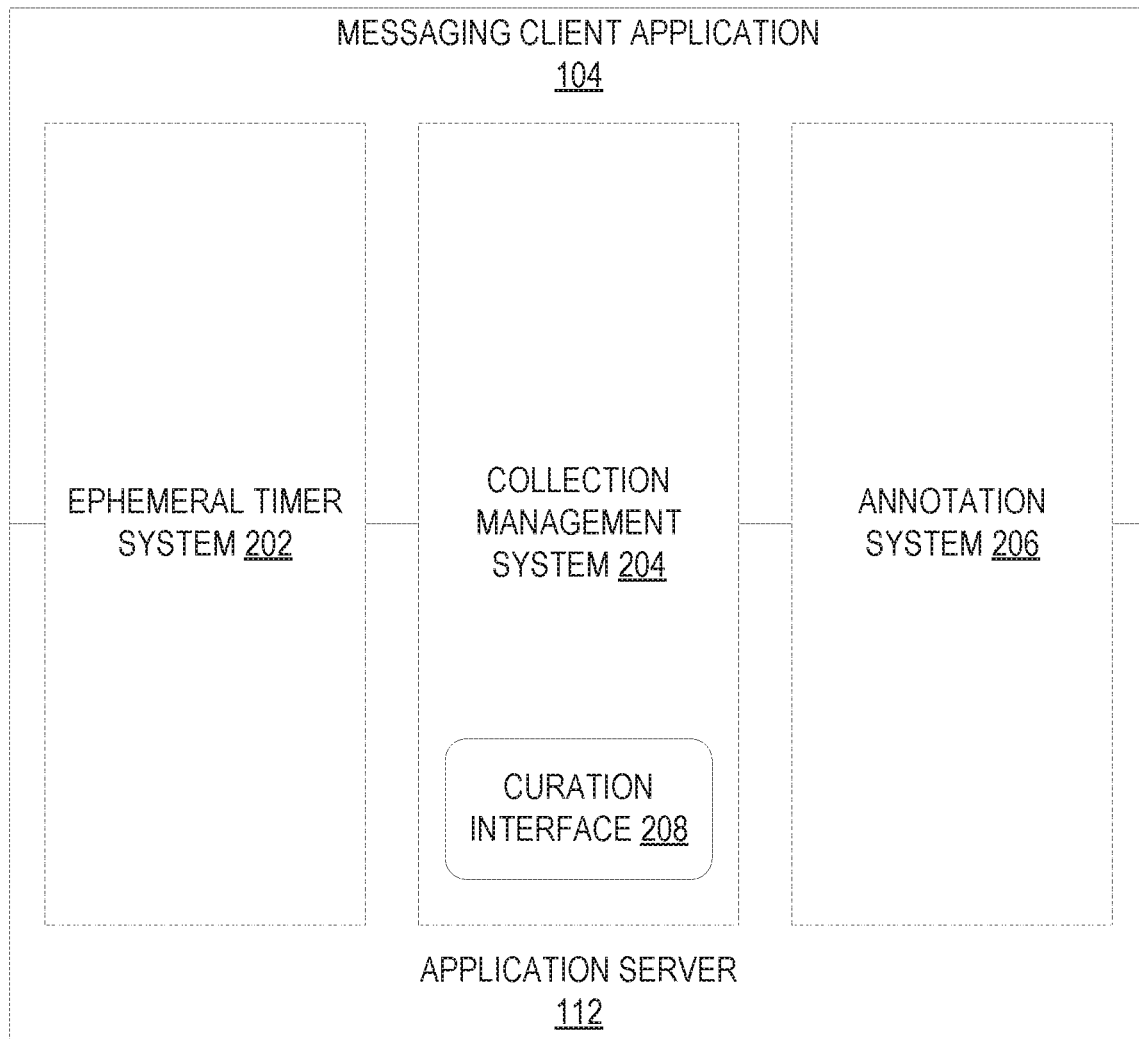
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages).

Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects.

Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is data corresponding to a lens (e.g., LENSES). As referred to herein, a lens is a type of media overlay. One example of a lens is a real-time special effect and sound that may be added to an image or video As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
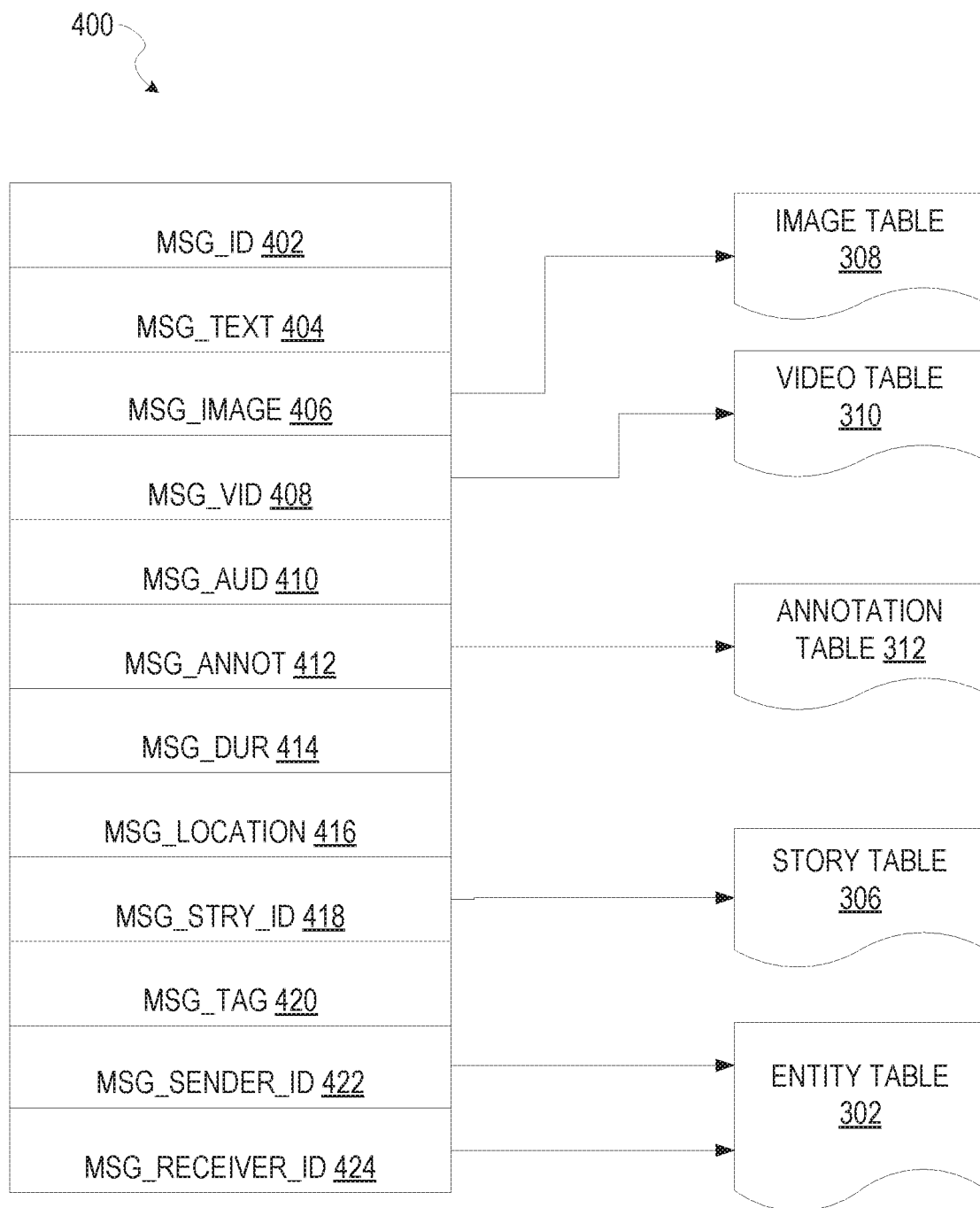
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
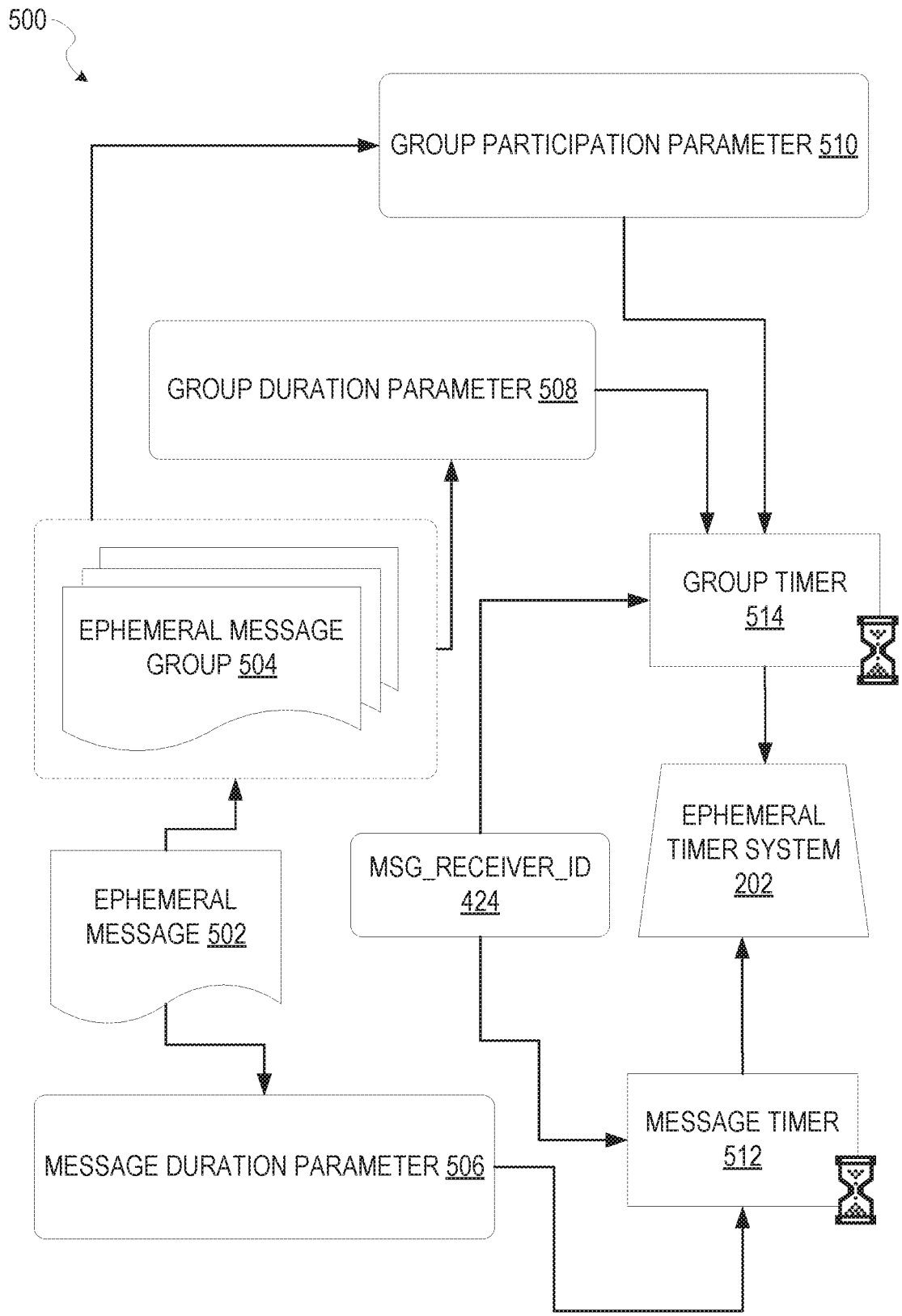
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized implementation of the ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
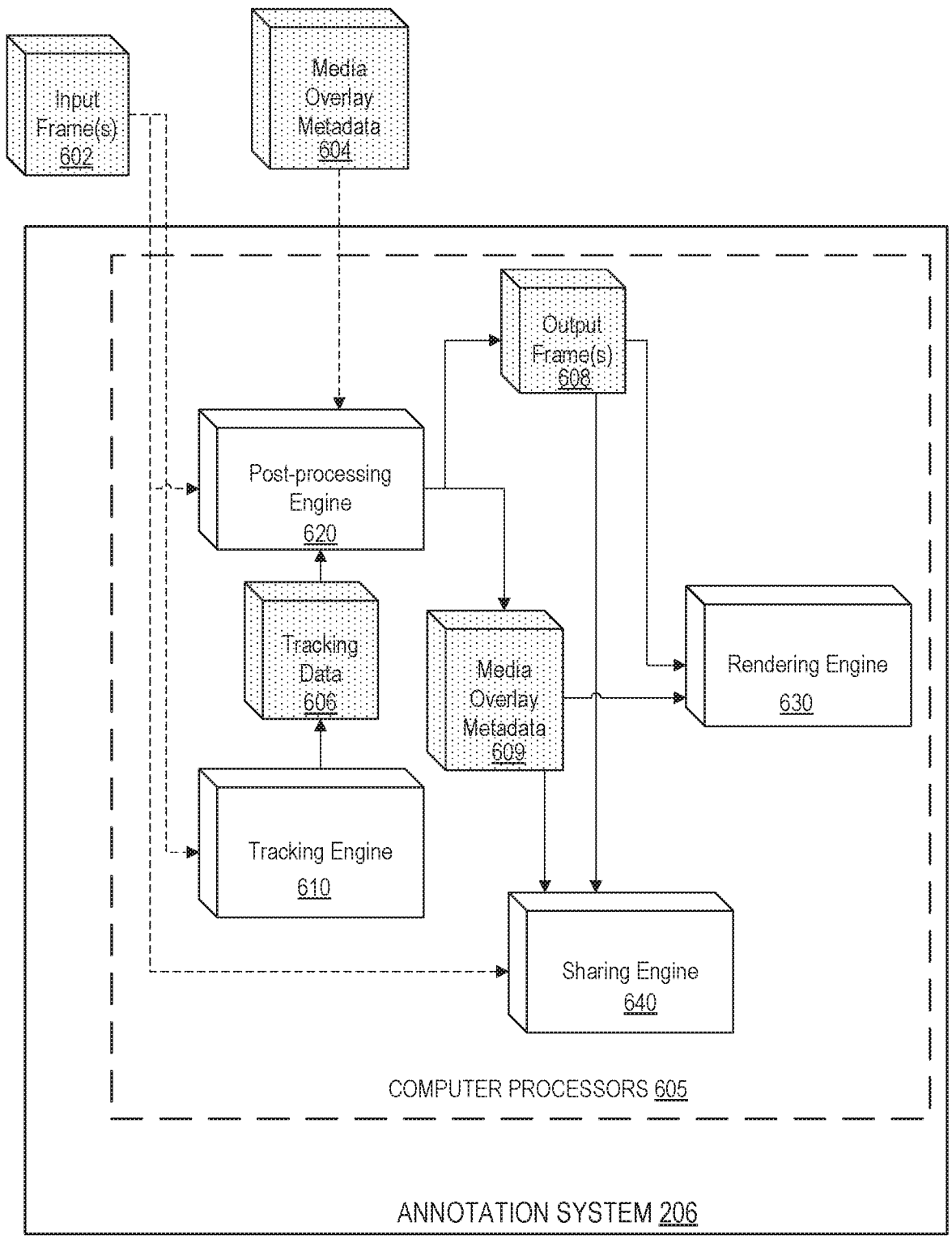
FIG. 6 is a block diagram illustrating various modules of an annotation system that implements a post-processing graphics pipeline, according to certain example embodiments.

FIG. 6 is a block diagram 600 illustrating various modules of an annotation system 206 that implements a post-processing graphics pipeline, according to certain example embodiments. The annotation system 206 is shown as including a tracking engine 610, a post-processing engine 620, a rendering engine 630, and a sharing engine 640. The various modules of the annotation system 206 are configured to communicate with each other (e.g., via a bus, shared memory, or a switch). Any one or more of these modules may be implemented using one or more computer processors 605 (e.g., by configuring such one or more computer processors to perform functions described for that module) and hence may include one or more of the computer processors 605 (e.g., a set of processors provided by the client device 102). In another embodiment, the computer processors 605 refers to a set of processors provided by a server or server system, such as the messaging server system 108.

Any one or more of the modules described may be implemented using hardware alone (e.g., one or more of the computer processors 605 of a machine (e.g., machine 3100) or a combination of hardware and software. For example, any described module of the annotation system 206 may physically include an arrangement of one or more of the computer processors 605 (e.g., a subset of or among the one or more computer processors of the machine (e.g., machine 3100) configured to perform the operations described herein for that module. As another example, any module of the annotation system 206 may include software, hardware, or both, that configure an arrangement of one or more computer processors 605 (e.g., among the one or more computer processors of the machine (e.g., machine 3100) to perform the operations described herein for that module. Accordingly, different modules of the annotation system 206 may include and configure different arrangements of such computer processors 605 or a single arrangement of such computer processors 605 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

For the purpose of clarity in explaining the technical concepts below, the following discussion relates to a single input frame. However, it is understood that for media content including multiple frames (e.g., a video), the following discussion would also be applicable.

The post-processing engine 620 receives an input frame 602 captured by a client device 102 such as included in a captured image or video. For example, the input frame 602 can be an image captured by an optical sensor (e.g., camera) of the client device 102 during capture of an image or video. An image, in an example, includes one or more real-world features, such a physical object(s) detected in the image. In some embodiments, the input frame 602 includes metadata describing the image and/or other information as discussed further herein.

As further illustrated, the tracking engine 610 receives the input frame 602 (or alternatively a duplicate of the input frame 602 in an embodiment). The tracking engine 610 can include various tracking functionality based on a type of object to track. In an example, the tracking engine 610 includes tracking capabilities for surface tracking, face tracking, object tracking, and the like. In an implementation, the tracking engine 610 may only execute one of each of a plurality of tracking processes at a time for facilitating the management of computing resources at the client device 102. In addition, the tracking engine 610 may perform one or more object recognition operations on the input frame 602.

As referred to herein, tracking refers to operations for determining spatial properties (e.g., position and/or orientation) of a given object (or portion thereof) during the post-processing stage. In an implementation, during tracking, the object's position and orientation are measured in a continuous manner. Different objects may be tracked, such as a user's head, eyes, or limbs, surfaces, or other objects. Tracking involves dynamic sensing and measuring to enable virtual objects and/or effects to be rendered with respect to physical objects in a three-dimensional space corresponding to a scene (e.g., the input frame 602). Thus, the tracking engine 610 determines metrics corresponding to at least the relative position and orientation of one or more physical objects in the input frame 602 and includes these metrics in tracking data 606 which is provided to the post-processing engine 620. In an example, the tracking engine 610 updates (e.g., track over time) such metrics from frame to subsequent frame.

In an implementation, the annotation system 206 can utilize techniques which combines information from the device's motion sensors (e.g., accelerometer and gyroscope sensors, and the like) with an analysis of the scene provided in the input frame 602. For example, the annotation system 206 detects features in the input frame 602, and as a result, tracks differences in respective positions of such features across several input frames using information derived at least in part on data from the motion sensors of the device.

As mentioned herein, surface tracking refers to operations for tracking one or more representations of surfaces corresponding to planes (e.g., a given horizontal plane, a floor, a table) in the input frame. In an example, surface tracking is accomplished using hit testing and/or ray casting techniques.

Hit testing, in an example, determines whether a selected point (e.g., pixel or set of pixels) in the input frame intersects with a surface or plane of a representation of a physical object in the input frame. Ray casting, in an example, utilizes a Cartesian based coordinate system (e.g., x and y coordinates) and projects a ray (e.g., vector) into the camera's view of the world, as captured in the input frame, to detect planes that the ray intersects.

As mentioned herein, face tracking refers to operations for tracking representations of facial features, such as portions of a user's face, in the input frame. In some embodiments, the tracking engine 610 includes facial tracking logic to identify all or a portion of a face within the one or more images and track landmarks of the face across the set of images of the video stream. As mentioned herein, object tracking refers to tracking a representation of a physical object in the input frame.

In an implementation, the tracking engine 610 provides, as output, tracking data 606 corresponding to the aforementioned metrics (e.g., position and orientation). In some instances, the tracking engine 610 includes logic for shape recognition, edge detection, or any other suitable object detection mechanism. The object of interest may also be determined by the tracking engine 610 to be an example of a predetermined object type, matching shapes, edges, or landmarks within a range to an object type of a set of predetermined object types.

The post-processing engine 620 modifies virtual content (e.g., changing its size, scale, direction/orientation, color, shape) such as performing an operation that affects the visual appearance and/or position of a virtual object(s) that may be anchored to a representation of a physical object in the scene of the input frame 602.

The post-processing engine 620 receives media overlay metadata 604 and input frame 602. In an example, media overlay metadata 604 includes information regarding a set of media overlays that are applied, by the post-processing engine 620, as effects to the input frame 602. In an example, the media overlay metadata 604 includes information described further below in connection with FIG. 7, which may be included as part (or stored separately) from the input frame 602.

The post-processing engine 620, in an embodiment, utilizes machine learning techniques for applying image processing to facial features in the input frame 602, using the media overlay metadata 604. One example of a machine learning model is a machine learning model (e.g., one or more neural networks) that has been trained to generate an "average face" by marking of the borders of facial features based on training data (e.g., several thousands of images). In this example, the machine learning model generates an "average face" that can be utilized to align with a face detected (e.g., object of interest) in the input frame 602 for use in performing image processing to modify the input frame to generate an output frame 608. Additionally, the post-processing engine 620 may perform the one or more modifications to the portions of the above-mentioned object of interest to generate the modified input frame (e.g., the output frame 608).

In one embodiment, the post-processing engine 620, in cooperation with the sharing engine 640, generates a message. The message includes the output frame 608, the media overlay metadata 609 and/or other metadata (e.g., as described herein), and in some instances, the original input frame 602. The sharing engine 640 transmits the generated message from the client device 102 to one or more other client devices, the messaging server system 108, or a storage device of the client device 102. Further, it is to be understood that by including the original input frame 602, example embodiments enable providing non-destructive editing for the message whereby a different image processing operation can be applied to the original input frame 602, which replaces previous image processing operation performed on output frame 608.

Further, the rendering engine 630 performs rendering of content for display by the messaging client application 104 using the media overlay metadata 609. The rendering may be performed in conjunction with graphical processing pipelines and/or media overlay stacking (e.g., the application of multiple media overlays to media content) described further herein.

Although the above discussion with respect to FIG. 6 refers to an input frame, it is appreciated that the aforementioned components of the annotation system can perform similar operations on a set of images (e.g., video) corresponding to respective frames of such video content.

Figure 7:
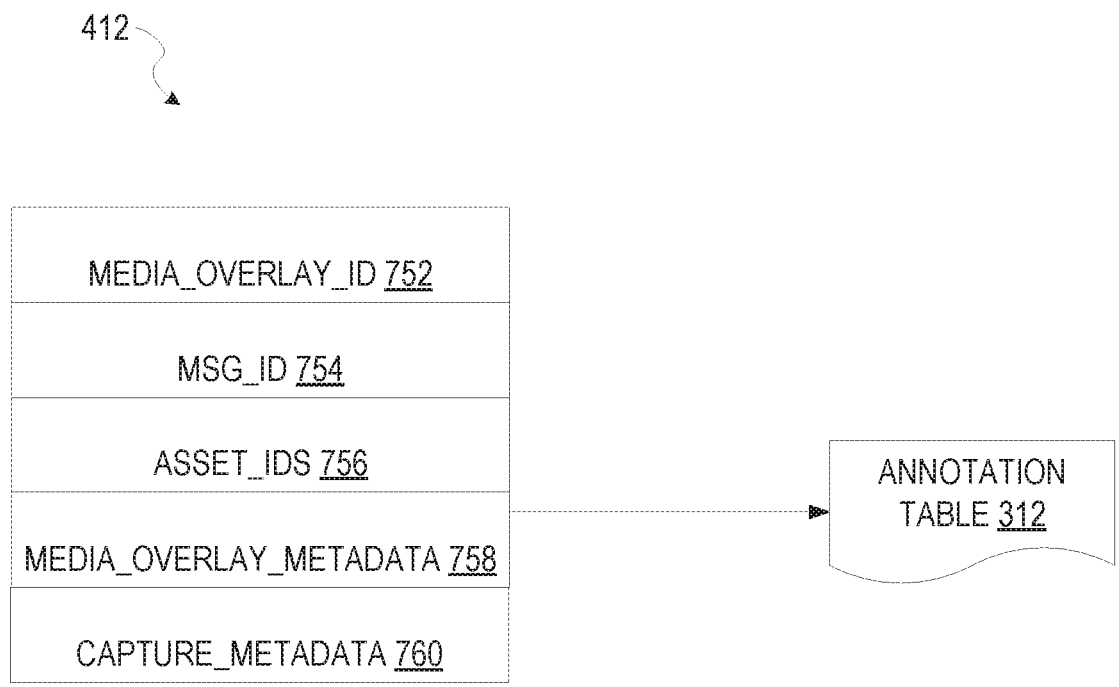
FIG. 7 is a schematic diagram illustrating a structure of the message annotations, as described in FIG. 4, including additional information corresponding to metadata for post-processing an image (e.g., the input frame), according to some embodiments.

FIG. 7 is a schematic diagram illustrating a structure of the message annotations 412, as described in FIG. 4, including additional information corresponding to metadata for post-processing an image (e.g., the input frame 702), according to some embodiments.

In an embodiment, the content of a particular message 400, as shown in FIG. 3, including the additional data shown in FIG. 7 is used to populate the message table 314 stored within the database 120 for a given message, which is then accessible by the messaging client application 104. As illustrated in FIG. 7, message annotations 412 includes the following components corresponding to data in connection with post-processing operations:

media overlay identifier 752: identifier of a media overlay utilized in the message with post-processing message identifier 754: identifier of the message with post-processing asset identifiers 756: a set of identifiers for assets in the message with post-processing. For example, respective asset identifiers can be included for assets that are determined by the particular media overlay. In an embodiment, such assets are created by the media overlay on the sender side client device, uploaded to the messaging server application 114, and utilized on the receiver side client device in order to recreate the message. Examples of typical assets include:

The original still RGB image(s) captured by the camera

Figure 8A:
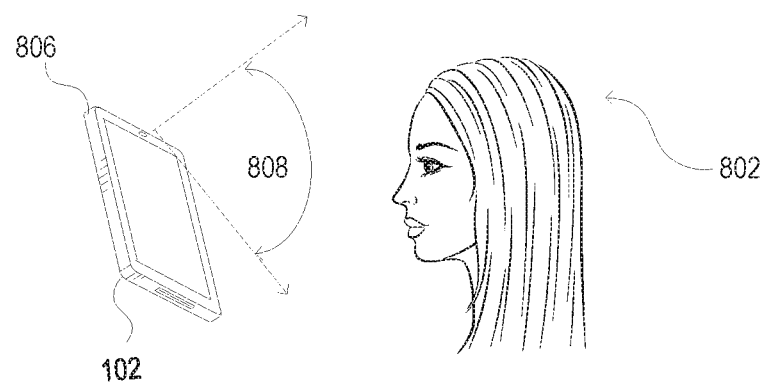
FIG. 8A and FIG. 8B illustrate examples of a user capturing an image for post-processing in the messaging client application (or the messaging system), according to some embodiments.
Figure 8B:
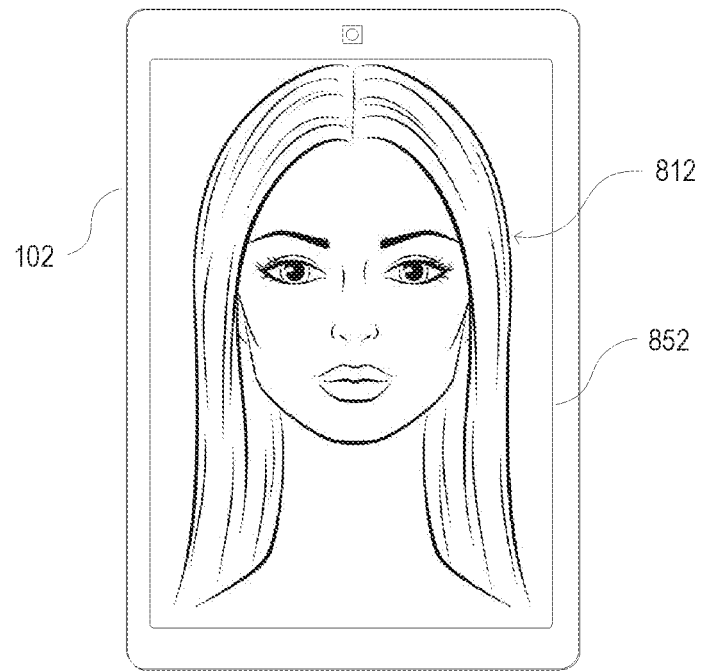

The post-processed image(s) with media overlay effects applied to the original image media overlay metadata 758: additional metadata associated with the media overlay corresponding to the media overlay identifier 752, such as:

media overlay category: corresponding to a type or classification for a particular media overlay media overlay carousel index carousel group: This can be populated and utilized when eligible post-capture media overlays are inserted into a carousel interface. In an implementation, a new value "POST_CAPTURE_LENS_DEFAULT_GROUP" (e.g., a default group assigned to a post capture media overlay can be added to the list of valid group names, and post-capture media overlays can be included this group unless another group is already explicitly set corresponding to metadata for a geolocation entity in the datastore.

capture metadata 760 corresponding to additional metadata, such as:
- camera image metadata
  - camera intrinsic data
    - focal length
    - principal point
  - other camera information (e.g., camera position)
- sensor information
  - gyroscopic sensor data
  - position sensor data
  - accelerometer sensor data
  - other sensor data
  - location sensor data FIG. 8A and FIG. 8B illustrate examples of a user capturing an image for post-processing in the messaging client application 104 (or the messaging system 100), according to some embodiments.

FIG. 8A illustrates an example situation in which a user 802 is capturing an image of a physical item in accordance with various embodiments. Although only a portable client device (e.g., the client device 102) is shown in FIG. 8A, it should be understood that various types of electronic or computing devices are capable of capturing, receiving and/or processing images in accordance with various embodiments discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these, and the like.

The client device 102 may have at least one camera 806. Each camera may be, for example, a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies.

As illustrated in the example of FIG. 8A, the user 802 can position the client device 102 such that the user's face, including various facial features, are within a field of view 808 of at least one camera 806 of the client device 102. The at least one camera 806 can capture a still image, which can be stored to local and/or remote storage for post-processing at a subsequent time. In some embodiments, the at least one camera 806 captures video, providing a "live" view of the captured video information, which can be stored to local and/or remote storage for post-processing at a subsequent time.

In a post-capture stage, the previous captured image is accessed from storage for further processing (e.g., post-processing). An image 812, including a representation of the face of the user 802, is displayed on a display screen 852 of the client device 102, as illustrated in the example of FIG. 8B. The user can then select various media overlays for applying effects and modifications to the displayed image.

Figure 9A:
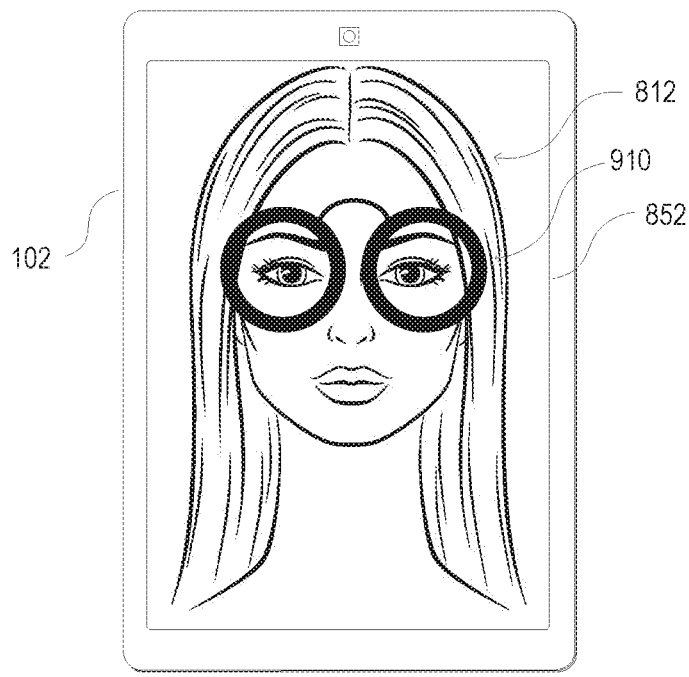
FIG. 9A and FIG. 9B illustrate examples of post-processing in the messaging client application (or the messaging system), according to some embodiments.
Figure 9B:
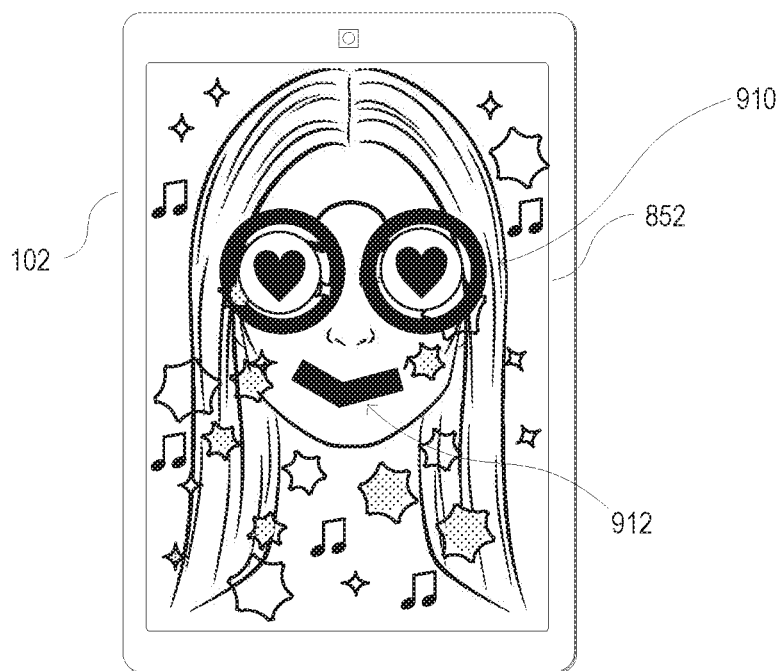

FIG. 9A and FIG. 9B illustrate examples of post-processing in the messaging client application 104 (or the messaging system 100), according to some embodiments. As shown in these examples, example embodiments enable applying various media overlays to previously captured images and/or videos in different layers such that respective graphical elements and/or effects are overlaid upon one another.

As illustrated in FIG. 9A and FIG. 9B, the client device 102 can provide for display of a media overlay, which may include visual and audio content corresponding to animations, media content, text content, and the like. It is appreciated that the media overlay displayed by the client device 102 can include audio and visual content and visual effects as described before in respect to FIG. 1 and FIG. 2.

As illustrated in FIG. 9A, an image 812 including the representation of the face of the user 802 is shown in the display screen 852 of the client device 102. A first media overlay 910 is applied to the image 812. Embodiments of the subject technology enable multiple media overlays to be applied to a given image, such as the image 812.

As illustrated in FIG. 9B, a second media overlay 912 is applied to the image comprising the first media overlay. The second media overlay 912 is displayed in conjunction with the first media overlay 910 in the display screen 852. In this manner, multiple media overlays can be applied to the image resulting in effects and graphical elements that are displayed in conjunction with the image to provide a composite image with several applied media overlays.

Figure 10A:
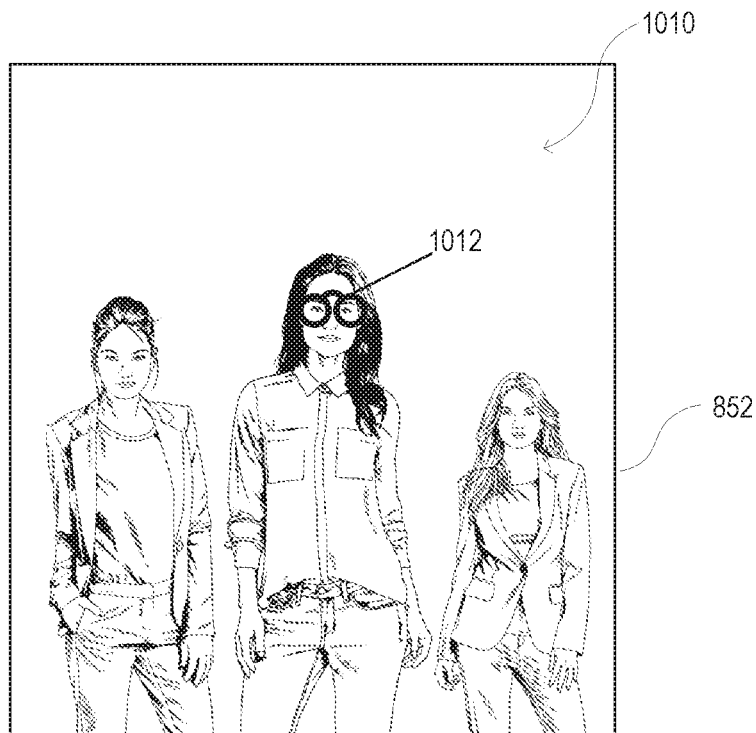
FIG. 10A and FIG. 10B illustrate other examples of post-processing in the messaging client application (or the messaging system), according to some embodiments.
Figure 10B:
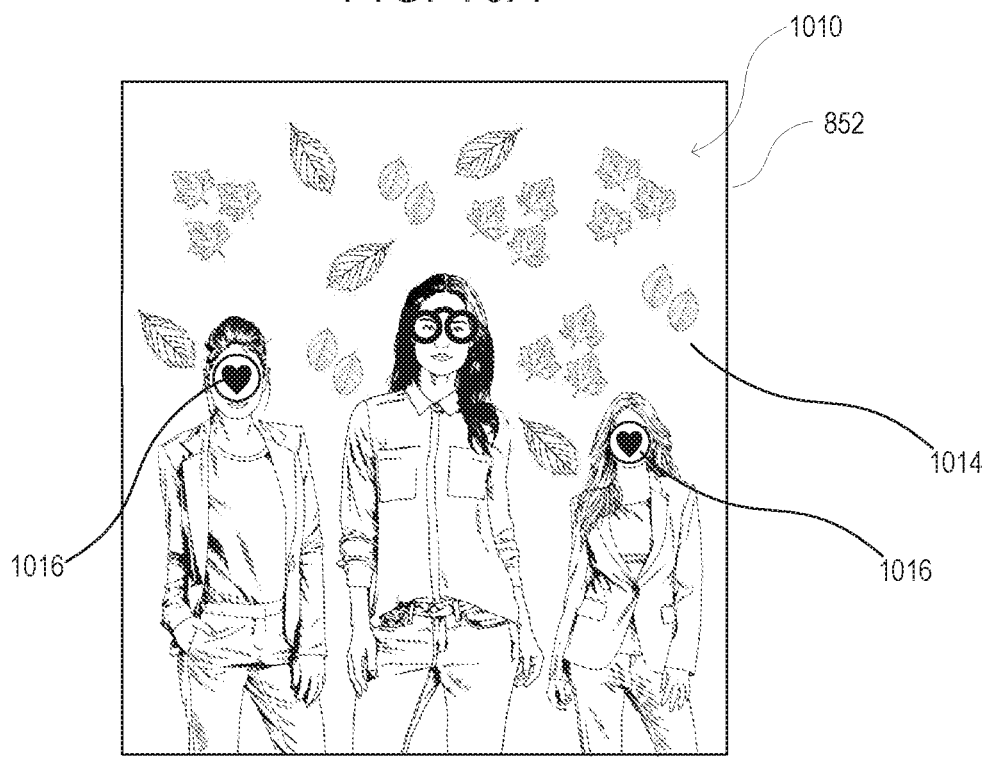

FIG. 10A and FIG. 10B illustrate other examples of post-processing in the messaging client application 104 (or the messaging system 100), according to some embodiments. As shown in these additional examples, example embodiments enable various media overlays to be applied to previously captured images and/or videos in different layers such that respective graphical elements and/or effects are overlaid upon one another. More specifically, the examples shown in FIGS. 10A and 10B include images of multiple users upon which respective media overlays can be applied as post-processing operations, in varying degrees, in order to provide visual and/or audio effects which may be provided for display in conjunction with one another.

As illustrated in FIG. 10A and FIG. 10B, the client device 102 provides for display a media overlay, which may include visual and audio content corresponding to animations, media content, text content, and the like. As mentioned before, it is to be appreciated that the media overlay displayed by the client device 102 can include audio and visual content and visual effects as described before with respect to FIG. 1 and FIG. 2.

As illustrated in FIG. 10A, an image 1010 includes a representation of a scene including several users (e.g., different persons) shown in the display screen 852 of the client device 102. A first media overlay 1012 is applied to a first user in the center of the scene that, as illustrated, provides a graphical representation of virtual glasses (e.g., virtual eyeglasses or spectacles).

As illustrated in FIG. 10B, a second media overlay 1014 and a third media overlay 1016 are applied to the image 1010 with the first media overlay. The second media overlay 1014 and the third media overlay 1016 are displayed in conjunction with the first media overlay 1012. In this example, the second media overlay 1014 includes an animation of graphical elements (e.g., virtual representations of leaves), and the third media overlay 1016 includes graphical elements that occlude respective faces of users. As a result, multiple media overlays can be applied to the image with multiple persons resulting in effects and graphical elements that are displayed in conjunction with the image to provide a composite image with several applied media overlays.

To enable the selection of media overlays for applying, as one or more post-processing operations, example embodiments provide various user interface implementations to facilitate an interactive user-facing experience which responds to various inputs provided by a given user. In some embodiments, the messaging client application 104 can provide the example user interface as discussed below with respect to FIG. 11.

In the following discussion, example embodiments enable the delivery and organized presentation of media overlays for post-processing media content. In some examples, media overlays can be displayed in conjunction, during a post-processing stage, with previously captured media content (e.g., images and/or video). As described further herein, when a user performs a particular touch input gesture (e.g., swipe, or drag gesture) within a user interface, a particular media overlay is identified and presented to the user.

Figure 11:
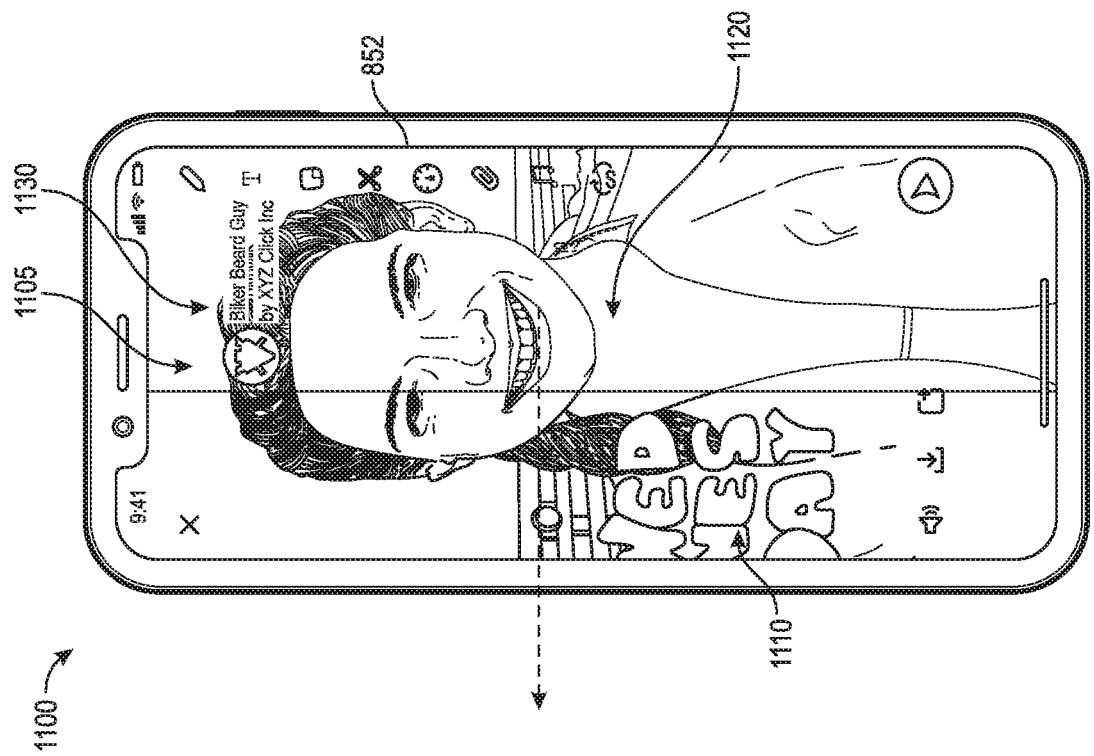
FIG. 11 illustrates examples of user interfaces for selecting a media overlay that applies post-processing to content (e.g., an image or video) in the messaging client application (or the messaging system), according to some embodiments.
Figure 11:
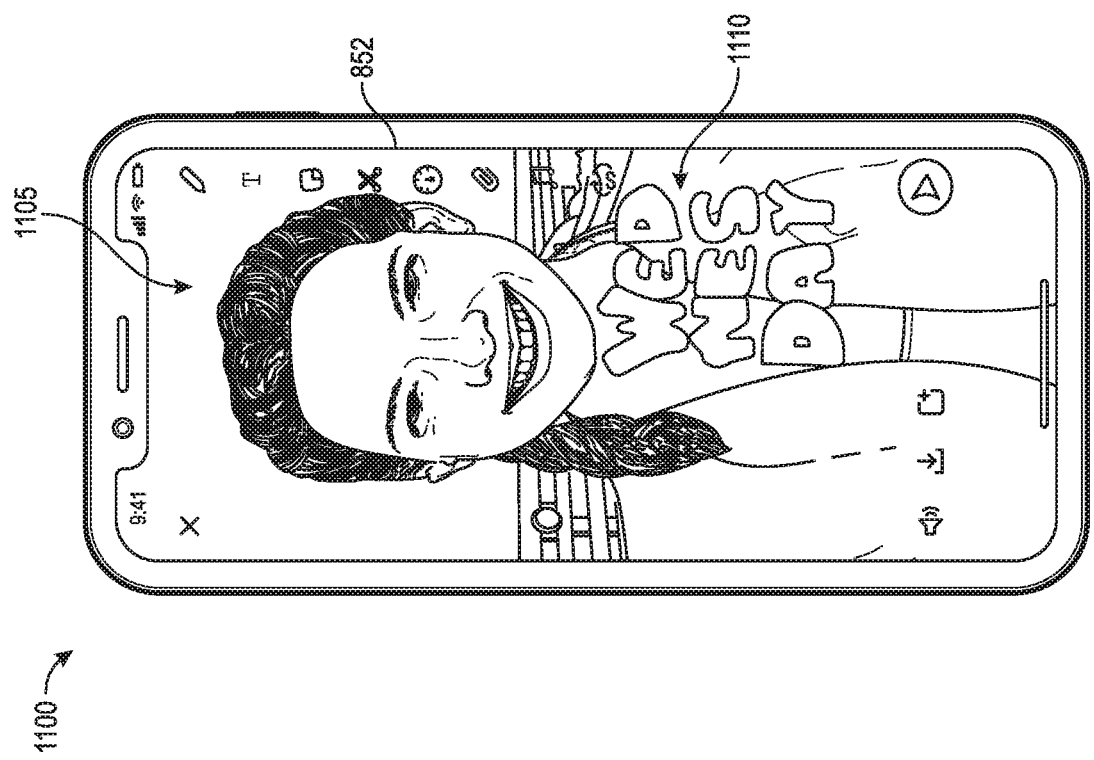

FIG. 11 illustrates examples of user interfaces for selecting a media overlay that applies post-processing to content (e.g., an image or video) in the messaging client application 104 (or the messaging system 100), according to some embodiments.

As illustrated in FIG. 11, the client device 102 provides for display of a media overlay, which may include visual and audio content corresponding to animations, media content, text content, and the like. As mentioned before, it is to be appreciated that the media overlay displayed by the client device 102 can include audio and visual content and visual effects as described above with respect to FIG. 1 and FIG. 2.

As illustrated in user interface 1100, an image 1105 corresponding to a representation of a scene with a portrait of a person, including a first media overlay 1110 (e.g., graphical text indicating a day of the week), is displayed in the display screen 852 of the client device 102. In an example, the first media overlay 1110 is selected based on a gesture input (e.g., swipe, touch input, and the like) which provides a rendering of the selected first media overlay 1110 to display a preview of the media overlay on the image. In the examples of FIG. 11, a gesture input can be received by the messaging client application 10 (or the messaging system 100), which triggers a selection of a respective media overlay which is then provided for display, which may also result in a current respective media overlay to be removed from the rendering of the composite image including one or more media overlays.

As further shown, in the user interface 1100, a second media overlay 1120 is provided for display in the display screen 852 of the client device 102. The second media overlay 1120, in an example, is displayed in response to a gesture input (e.g., swipe) and then displayed in a progressive manner as the gesture input moves across the display screen 852 of the client device 102 (e.g., as indicated by the leftward arrow). The second media overlay 1120 also includes a text and icon overlay 1130 indicating a description of the selected media overlay for applying during post-processing (e.g., "Biker Bearded Guy"). The second media overlay 1120, in this example, serves as a transition effect to transition between the first media overlay 1110 to the newly selected media overlay. As further shown, the first media overlay 1110 is shown to move outside and eventually disappearing from the display screen 852 as the gesture input progresses across the display screen 852.

Figure 12:
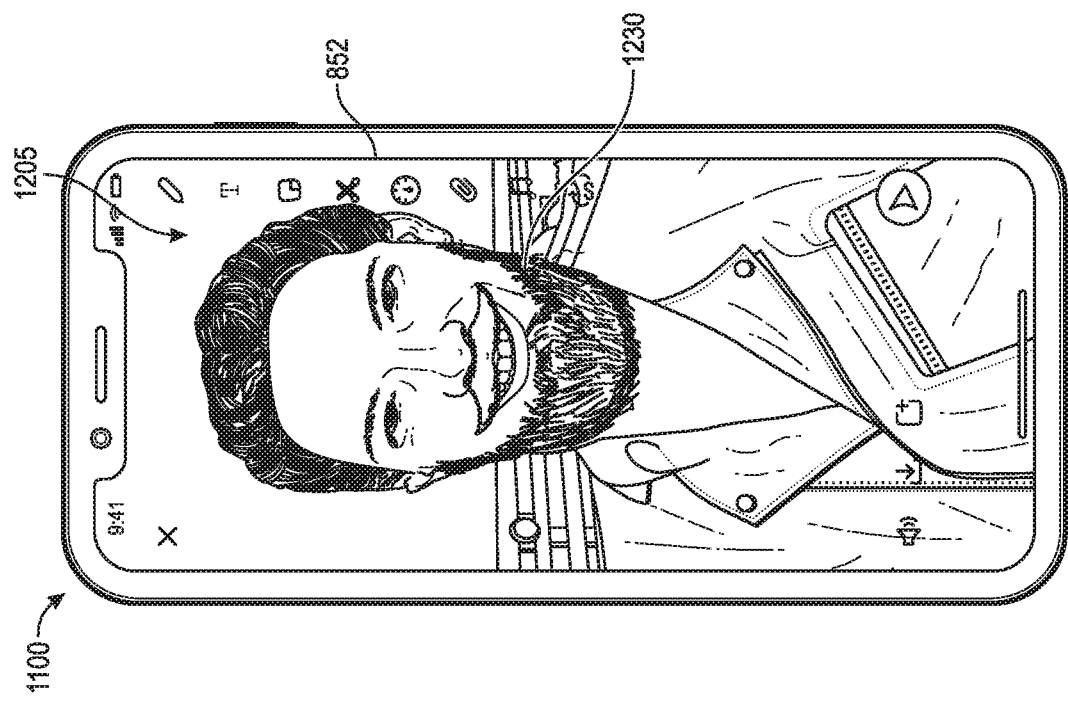
FIG. 12 illustrates examples of user interfaces for selecting a media overlay that applies post-processing to content (e.g., an image or video) in the messaging client application (or the messaging system), according to some embodiments, which follows the examples described in FIG. 11A and FIG. 11B.
Figure 12:
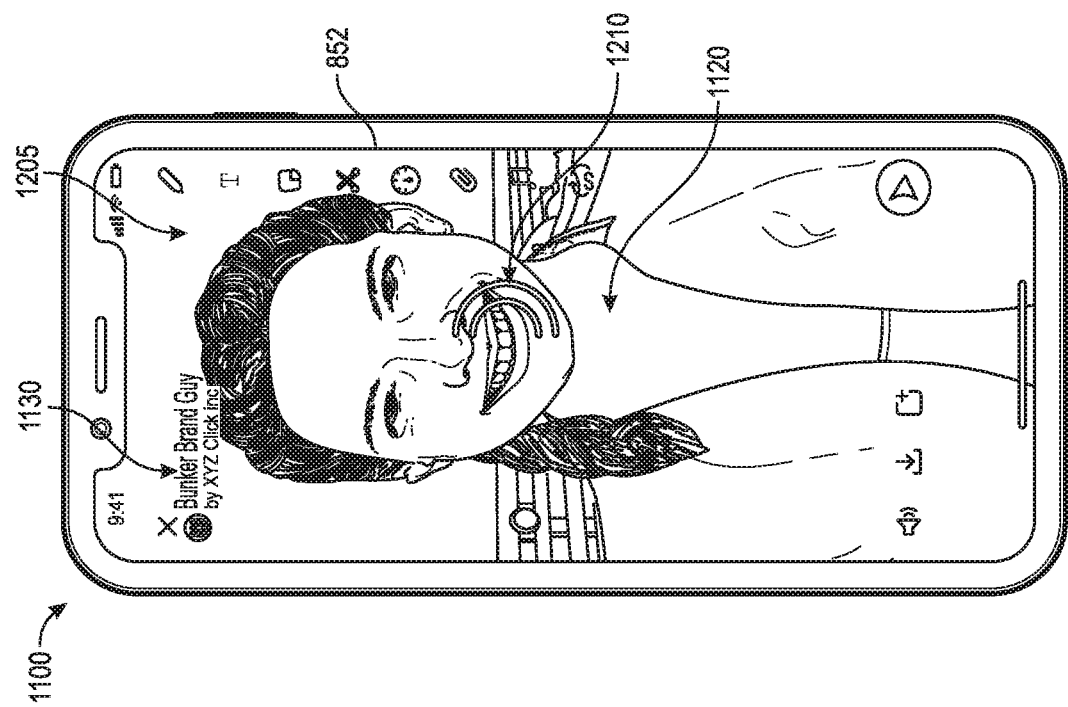

FIG. 12 illustrates examples of user interfaces for selecting a media overlay that applies post-processing to content (e.g., an image or video) in the messaging client application 104 (or the messaging system 100), according to some embodiments, which follows the examples described in FIG. 11A and FIG. 11B.

As illustrated in FIG. 12, the client device 102 can provide for display of a media overlay, which may include visual and audio content corresponding to animations, media content, text content, and the like. As mentioned before, it is appreciated that the media overlay displayed by the client device 102 can include audio and visual content and visual effects as described before in FIG. 1 and FIG. 2.

As illustrated in user interface 1100, an image corresponding to a representation of a scene 1205 with a portrait of a person (e.g., the same or similar representation to that in FIG. 11 described above), including the second media overlay 1120 (e.g., the transition effect) and the text and icon overlay 1130, is displayed in the display screen 852 of the client device 102. In an example, the second media overlay 1120 is displayed in the entirety of the display screen 852 after the end of the gesture input (e.g., swipe, touch input, and the like) described above in FIG. 11. As further shown, a graphical indicator 1210 is displayed to indicate that post-processing operations in connection with the selected media overlay are currently being performed (e.g., as a background process) in preparation for rendering the selected media overlay.

As further shown in the user interface 1100, the selected media overlay is now displayed as a third media overlay 1230 in the representation of the scene 1205 with the portrait of the person in the display screen 852 of the client device 102. In this manner, different selected media overlay may be provided for display utilizing one or more gesture inputs. In a further example, a subsequent gesture input may be received which repeats similar operations described in FIG. 11 and FIG. 12 in which another media overlay is applied to the representation of the scene.

Although gesture inputs are discussed in the examples of FIG. 11 and FIG. 12, it is appreciated that other inputs can be received including non-touch based inputs and/or movement based inputs (e.g., from a head-mounted display, such as a virtual reality (VR), mixed reality (MR), or augmented reality (AR) device).

As described above, media overlays, such as LENSES, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple media overlays (e.g., LENSES), a user can use a single video clip with multiple LENSES to see how the different LENSES will modify the stored clip. For example, multiple LENSES that apply different pseudorandom movement models can be applied to the same content by selecting different LENSES for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different LENSES will look within different windows in a display at the same time. This can, for example, enable multiple windows with different pseudorandom animations to be viewed on a display at the same time.

Data and various systems to use LENSES or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging application 104 operating on the client device 102. The transform system operating within the messaging application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system, and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different media overlays to be applied in corresponding different layers. Such a graphical processing pipeline provides an extensible rendering engine for providing multiple media overlays that are included in a composite media (e.g., image or video) for rendering by the messaging client application 104 (or the messaging system 100).

In implementations described herein, computer graphics systems, which can render two-dimensional (2D) objects or objects from a three-dimensional (3D) world (real or imaginary) onto a 2D display screen, are currently used in a wide variety of applications. Such a graphics system (e.g., one included on the client device 102) includes a graphics processing unit (GPU) in some implementations for performing image processing operations and rendering graphical elements for display. The following discussion below with respect to FIG. 13 and FIG. 14 describes example graphical processing pipelines. In some embodiments the example graphical processing pipelines are utilized in conjunction with the operations described above in respect to at least FIG. 8A, FIG. 8B, FIG. 9A, FIG. 9B, FIG. 10A, FIG. 10B, FIG. 11, and FIG. 12, to provide layering of various media overlays for post-processing of media content.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular media overlay that is applied to an input frame (e.g., image or video). A shader can be implemented as code running on a specialized processing unit, also referred to as a shader unit or shader processor, usually executing several computing threads, programmed to generate appropriate levels of color and/or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, and/or pixel shading is performed at a particular per-pixel rate. In this manner, a given electronic device (e.g., the client device 102) operates the graphical processing pipeline to convert information corresponding to objects into a bitmap that can be displayed by the electronic device. In some implementations, example embodiments provide various aspects of a graphical processing pipeline as discussed above to provide post-processing for layering (e.g., stacking) of respective media overlays onto media content to render a composite media content, as described further below.

Figure 13:
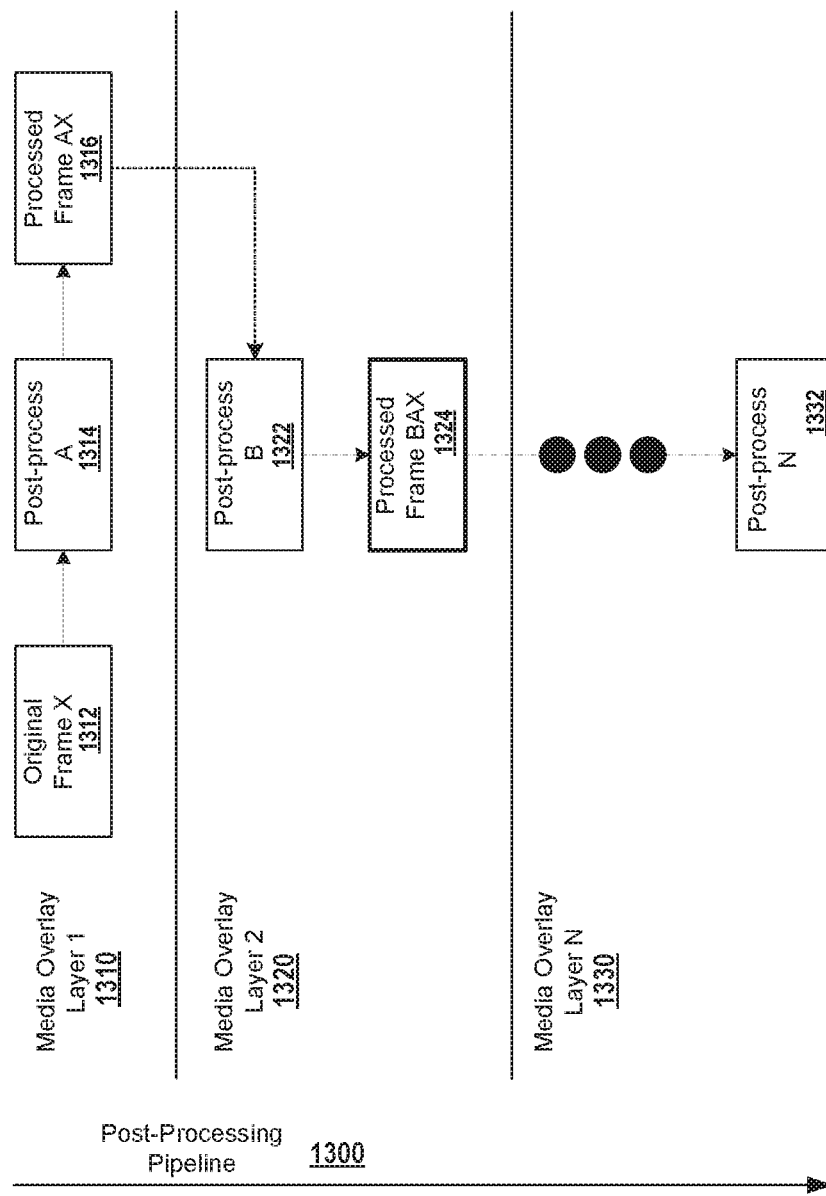
FIG. 13 is a schematic diagram of an example of a graphical processing pipeline, namely a post-processing pipeline implemented for components (e.g., a GPU) of the client device, according to some example embodiments.

FIG. 13 is a schematic diagram of an example of a graphical processing pipeline, namely a post-processing pipeline 1300 implemented for components (e.g., a GPU) of the client device 102, according to some example embodiments. More specifically, the example of FIG. 13 illustrate a graphical processing pipeline where graphical operations performed on a given input frame are cumulative such that the input frame is processed in accordance with a first selected media overlay and the output of the processing is then provided as input for processing in accordance with a second selected media overlay, and so on throughout the remaining stages of the graphical processing pipeline.

In an embodiment, the post-processing pipeline 1300 illustrated in FIG. 13 (and also in FIG. 14 discussed below) implements an extensible rendering engine which supports multiple image processing operations corresponding to respective media overlays. Such an extensible rendering engine enables a reduction in the consumption memory resources of a given electronic device (e.g., the client device 102) as a single rendering engine can be loaded into memory for execution rather than having multiple different rendering engines in memory, each occupying distinct memory spaces, as in some existing implementations.

In one example, the client device 102 is configured to implement one or more of the stages of the post-processing pipeline 1300, which are shown as various media overlay layers 1310-1330 each corresponding to a respective media overlay. In an example, each media overlay layer 1310-1330 is configurable, for instance, to perform one or more shader and/or image processing operations corresponding to a particular media overlay.

As shown in media overlay layer 1310, the post-processing pipeline 1300 receives an original frame 1312 and performs post-processing operations 1314 such as transformations, color effects, shader effects (e.g., distortions), face effects, and the like, based on a first selected media overlay, and outputs a processed frame 1316.

As shown in media overlay layer 1320, the post-processing pipeline 1300 receives the processed frame 1316 and performs second post-processing operations 1322 based on a second selected media overlay. A second processed frame 1324 is provided as output to a subsequent media overlay layer corresponding to media overlay layer 1330.

Further, as shown in media overlay layer 1330, the post-processing pipeline 1300 receives the second processed frame 1324 and performs third post processing operations 1332 based on a third selected media overlay. In another example, the media overlay layer 1330 is instead an output layer which generates pipeline output data (e.g., the second processed frame 1324) for rendering whereby the third post processing operations 1332 correspond to operations for the pipeline output data.

Figure 14:
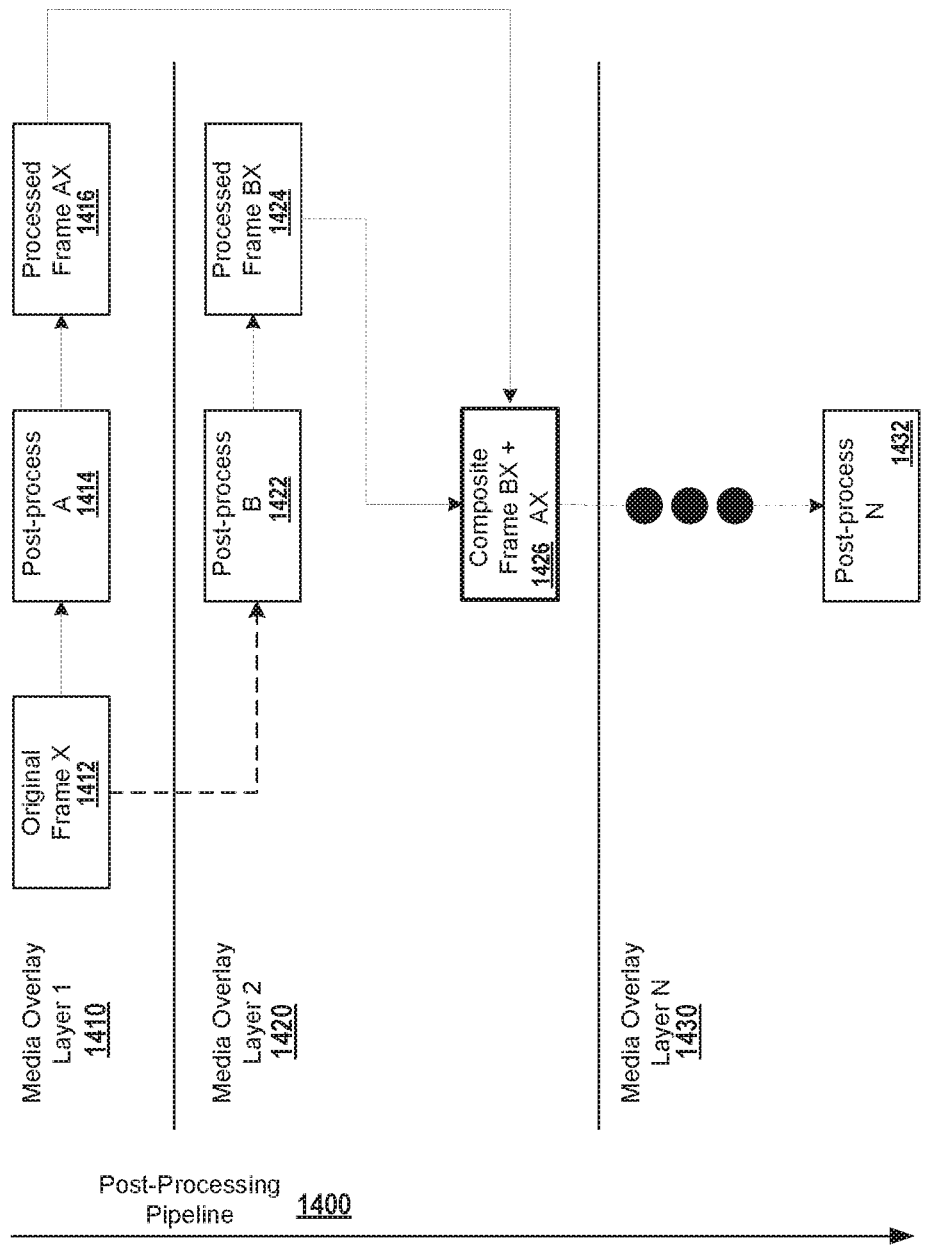
FIG. 14 is a schematic diagram of an example of a graphical processing pipeline, namely a post-processing pipeline implemented for components (e.g., a GPU) of the client device, according to some example embodiments.

FIG. 14 is a schematic diagram of an example of a graphical processing pipeline, namely a post-processing pipeline 1400 implemented for components (e.g., a GPU) of the client device 102, according to some example embodiments. More specifically, the example of FIG. 14 illustrate a graphical processing pipeline where graphical operations are respectively performed on a given input frame such that the input frame is processed in accordance to a first selected media overlay, and the same (original) input frame is provided as input for processing in accordance to a second selected media overlay, and the respective processed input frames and then composited together in a single composite image for rendering. Thus, it is understood that FIG. 14 differs from FIG. 13 in that each media overlay layer of the post-processing pipeline in FIG. 14 are applied to the original input frame.

As illustrated, the client device 102 is configured to implement one or more of the stages of the post-processing pipeline 1400, which are shown as various media overlay layers 1410-1430 corresponding to respective media overlays. In an example, each media overlay layer 1410-1430 is configurable, for instance, to perform one or more shader and/or image processing operations corresponding to a particular media overlay.

As shown in media overlay layer 1410, the post-processing pipeline 1400 receives an original frame 1412 and performs first post-processing operations 1414 such as transformations, color effects, shader effects (e.g., distortions), face effects, and the like, and outputs processed frame 1416.

As shown in media overlay layer 1420, the post-processing pipeline 1400 receives the original frame 1412 and performs second post-processing operations 1422 based on a second selected media overlay, and outputs processed frame 1424. Prior to continuing to media overlay layer 1430, the post-processing pipeline 1400 generates a composite frame 1426 which merges blends or otherwise combines the processed frame 1416 and the processed frame 1424.

Further, as shown in media overlay layer 1430, the post-processing pipeline 1400 receives the composite frame 1426 and performs third post processing operations 1432 based on a third selected media overlay. In another example, the media overlay layer 1430 is instead an output layer which generates pipeline output data (e.g., the composite frame 1426) for rendering whereby the third post processing operations 1432 correspond to operations for the pipeline output data.

Figure 15:
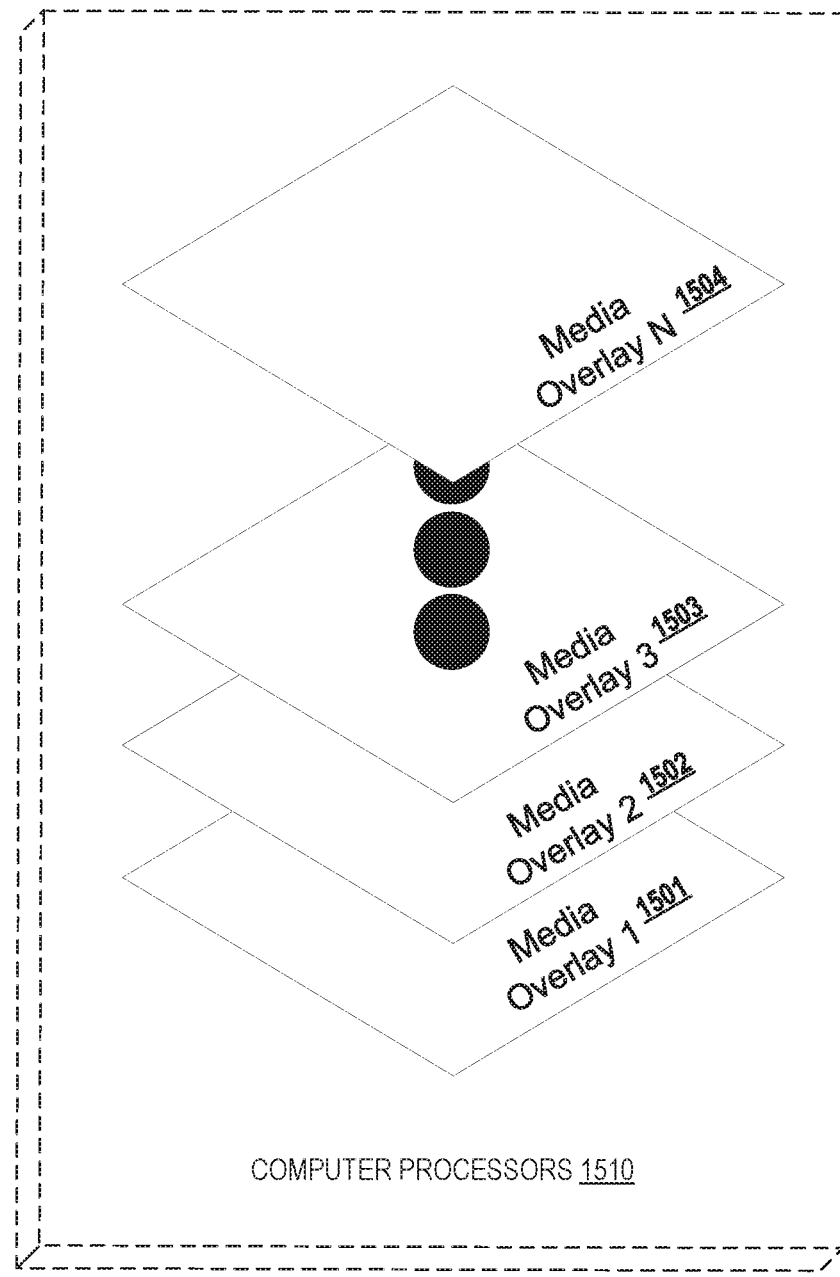
FIG. 15 is a schematic diagram of an example of a stacking of media overlay layers as implemented via a graphical processing pipeline, namely the post-processing pipeline(s) described above in FIG. 13 and/or FIG. 14, according to some example embodiments.

FIG. 15 is a schematic diagram of an example of a stacking of media overlay layers as implemented via a graphical processing pipeline, namely the post-processing pipeline(s) described above in FIG. 13 and FIG. 14, according to some example embodiments.

As illustrated in the example of FIG. 15, the stacking of media overlay layers can be implemented and executed on computer processors 1510, such as when provided by a given electronic device (e.g., the client device 102). A first media overlay layer corresponding to a first media overlay 1501 is applied to media content by the computer processors 1510. A second media overlay layer corresponding to a second media overlay 1502 is applied to media content by the computer processors 1510. A third media overlay layer corresponding to a third media overlay 1503 is applied to media content by the computer processors 1510. Further, a fourth media overlay layer corresponding to a fourth media overlay 1504 is applied to media content by the computer processors 1510. In this manner, various media overlays can be stacked and applied to media content for inclusion in a message.

Although four various layers are described as examples in FIG. 15, it is appreciated that fewer or more layers can be provided without departing from the scope of the subject technology.

As previously discussed, embodiments of subject technology enable the delivery and organized presentation of media overlays for post-processing media content, for use at a computing device (e.g., the client device 102). In some examples, respective media overlays can be displayed in conjunction, during a post-processing stage, with previously captured media content (e.g., images and/or video). As described further herein, when a user performs a particular touch input gesture (e.g., swipe, or drag gesture) within a user interface, a particular a media overly is selected and presented to the user.

The particular media overlay may be selected according to a ranking within a set of media overlays and according to a ranking of the set of media overlays. The particular media overlay can be selected according to a ranking among other media overlays within a specified classification (e.g., filter type, LENSES type, and the like), according to a ranking across other media overlays of other classifications, or a combination thereof. In an embodiment, a set of media overlays can be grouped based on the same classification for presentation in a carousel interface. Remaining media overlays in the set of media overlays may also be selected for presentation in the carousel interface as discussed below.

In some embodiments, a given electronic device (e.g., the client device 102 and/or the messaging server system 108) determines a ranking score to each media overlay, from a normal distribution. In some embodiments, a respective media overlay (e.g., filter) can be given a "boost" in order to boost distribution by N standard deviations. In an example, each media overlay may be assigned a default score (e.g., priority) based on a predetermined value (e.g., 500) within a predetermined range of values (e.g., 0 to 1000). The ranking score can be considered an indicator of relevancy for the respective media overlay in an example. Such an indicator of relevancy (e.g., relevance score or metric) can be based on various signals including, for example, a geolocation, a time or date, an object that is recognized in the retrieved image data, usage, and the like. Based on such signals the ranking score can be adjusted higher or lower to indicate whether the media overlay is considered more or less relevant, respectively, with respect to the retrieved image data and/or a classification (e.g., type) associated with the media overlay.

In some embodiments, presentation of media overlays within the user interface can be determined utilizing machine learning techniques. An electronic device (e.g., the client device 102) may learn whether a media overlay belongs to one classification or another. The electronic device may utilize a ranking approach to evaluate relevancy and priority of a media overlay relating to the classification (e.g., name or description, numerical indicator, universally unique identifier (UUID), and the like) and the ordering of its corresponding record of media overlays. The record of media overlays can be any appropriate data structure, including for example, a table, a list, an array, a vector, a file, and the like. After adding a media overlay into the record, the electronic device may alter or move the media overlay to change the order in which the media overlay appears in a presentation of media overlays within the user interface. In an example, the electronic device may remove less relevant or lower priority media overlays from storage, for example, increasing storage available for user-generated content. The electronic device or a server may prioritize delivery over a network of more relevant or higher priority media overlays or sets of media overlays, for example, improving responsiveness of the user interface when selecting certain media overlays.

A set of media overlays can include any number of media overlays. However, it is appreciated, in some embodiments, the number of media overlays provided for inclusion with the user interface is constrained based on a predetermined limit to facilitate a reduction in utilization of computing resources (e.g., memory, display power, battery, etc.). Media overlays in a set may be ordered, ranked, prioritized, or otherwise organized according to one or more predetermined criteria such as based on a media overlay type as discussed further below. Each set (e.g., group) of media overlays in a plurality of sets of media overlays may be ordered, ranked, prioritized, or otherwise organized according to one or more predetermined criteria (e.g., usage and the like). Each set of media overlays may include any number of distinct media overlays organized based on a media overlay type as discussed further below. Further, media overlays may be organized, prioritized, or otherwise arranged in each set according to usage, rank, and the like.

In some embodiments, an electronic device (e.g., the client device 102 and/or one or more components of the messaging server system 108) selects the set of media overlays by comparing or matching a classification (e.g., same media overlay type) associated with one or more media overlays in the set of media overlays.

In some embodiments, each media overlay corresponding to a media overlay is associated with at least one classification (e.g., a category associated with a given media overlay). Classifications may correspond various categories (e.g., a classification label or category indicator for the media overlay), which are then utilized for organizing (e.g., grouping) respective media overlays into various sets (e.g., groups) for including with a user interface for presenting (and interaction) with a given user of the electronic device. Based at least in part on such groupings, the user can select multiple media overlays, via the user interface, for applying to media content during a post-processing stage as discussed with respect to FIG. 16 and FIG. 17. Various classifications of media overlays are discussed in more detail in the examples of FIG. 18 to FIG. 25.

Further, in an implementation, whether a media overlay is selected for inclusion in the carousel is dependent on whether a media overlay applicable context includes information indicating that the media overlay is considered a post-capture media overlay (e.g., can be previewed or rendered for display by the electronic device on media content during post-processing). The media overlay applicable context therefore may be used to determine that the media overlay can be applied, with respect to media content, as a post-processing image operation in a post-capture stage. In another example, a context is determined based on a determination that the client device 102 and/or the messaging client application 104 has accessed media content for modifying during a post-capture time period, which in turn initiates the process for populating the record of media overlays that is then utilized for selecting media overlays for presenting in the carousel.

Figure 16:
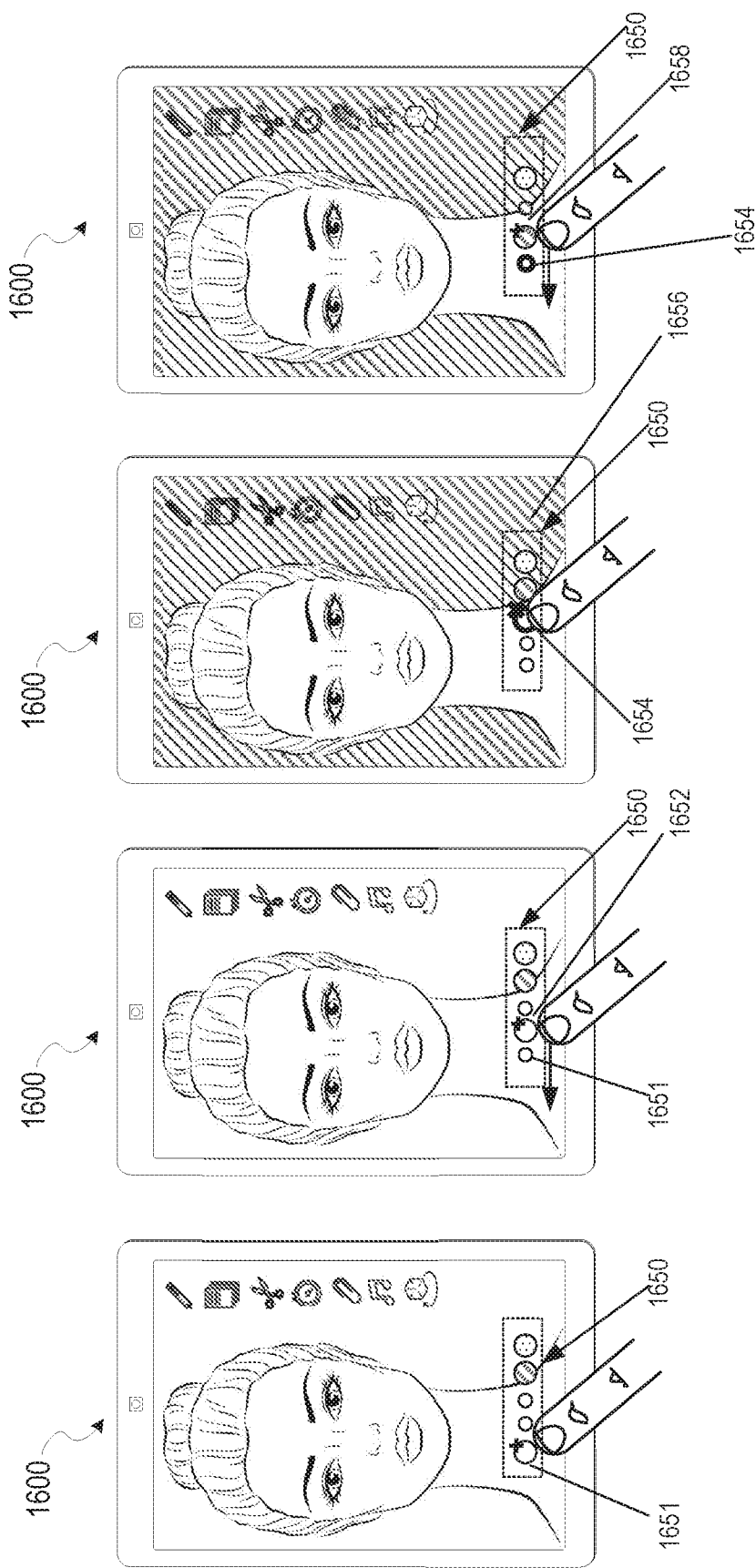
FIG. 16 illustrates examples of user interfaces (e.g., carousel) for selecting and stacking multiple media overlays for applying post-processing to media content (e.g., an image or video) in the messaging client application (or the messaging system), according to some embodiments.

FIG. 16 illustrates examples of user interfaces comprising a carousel for selecting and stacking multiple media overlays for applying post-processing to media content (e.g., an image or video) in the messaging client application 104 (or the messaging system 100), according to some embodiments.

In embodiments of such user interfaces, selectable graphical items 1650 may be presented in a carousel arrangement in which a portion or subset of the selectable graphical items 1650 are visible on a display screen of a given computing device (e.g., the client device 102). By way of example, the user can utilize various inputs to rotate the selectable graphical items onto and off of the display screen in manner corresponding to a carousel providing a cyclic view of the graphical items. The carousel arrangement as provided in the user interfaces therefore allow multiple graphical items to occupy a particular graphical area on the display screen.

As described herein, media overlays can be organized into respective groups for including on the carousel arrangement thereby enabling rotating through media overlays by group. Further, media overlays can be selected for inclusion based on various signals including, for example, time, date, geolocation, metadata associated with the media content, and the like. Similarly, media overlays can be grouped based on such signals. Moreover, a score can be generated and assigned to each media overlay, and based at least in part on the respective scores, a subset of the media overlays are selected for inclusion on the carousel arrangement of the user interface in an example. In the carousel arrangement of the user interface examples of FIG. 16, respective media overlays are selected from different groups of media overlays as discussed below.

In the following discussion, the selectable graphical items correspond to respective media overlays that are applied to media content as part of post-processing. During post-processing the media content has been previously captured and then retrieved from storage. As illustrated in user interface 1600, selectable graphical items 1650, corresponding to a carousel arrangement, includes a selectable graphical item 1651 in the display screen of an electronic device (e.g., the client device 102). The selectable graphical item 1650 is selected via a touch input by the user.

In a second example of FIG. 16, the user instead provides a different touch input corresponding to a swipe or drag gesture that enables scrolling through (e.g., providing navigation through various graphical items presented in the user interface 1600) the selectable graphical items 1650, and a second selectable graphical item 1652 is displayed in response to the swipe or drag gesture. The second selectable graphical item 1652, as indicated in the user interface 1600, belongs to the same group of media overlays as the selectable graphical item 1650.

In a third example of FIG. 16, the user continues the swipe or drag gesture which results in a display of a third selectable graphical item 1654 in the user interface 1600. In this example, the third selectable graphical item 1654 also belongs to the same group of media overlays as the respective media overlays corresponding to the selectable graphical item 1651 and the second selectable graphical item 1652. To apply the media overlay corresponding to the third selectable graphical item 1654, a further input may be provided by the user such as another touch input (e.g., tap, or press).

In the third example, the user provides a subsequent input (e.g., a tap or press) in order to apply the media overlay corresponding to the third selectable graphical item 1654. In response, a media overlay 1656 is applied and provided for display in the user interface 1600 on the display screen. After applying the media overlay 1656, the user interface 1600 provides an indication that the third selectable graphical item 1654 was previously selected (e.g., by highlighting the third selectable graphical item 1654).

In a fourth example of FIG. 16, the user then provides a subsequent swipe or drag gesture that further enables scrolling through the selectable graphical items 1650. In an embodiment, due to display area restrictions of the carousel arrangement, the user interface displays the third selectable graphical item 1654 as a smaller version of itself, while also having other selectable graphical items be hidden (or disappear) from the carousel arrangement. In response to the swipe or drag gesture, the user interface 1600 displays a fourth selectable graphical item 1658, which based on the graphical indication, belongs to a different group of media overlays than the first group including the media overlay corresponding to the previously selected third selectable graphical item 1654. The user can continue the swipe or drag gesture (or alternatively start a new swipe or drag gesture) to scroll through other selectable graphical items for further selecting an additional media overlay (e.g., in a different media overlay group).

Figure 17:
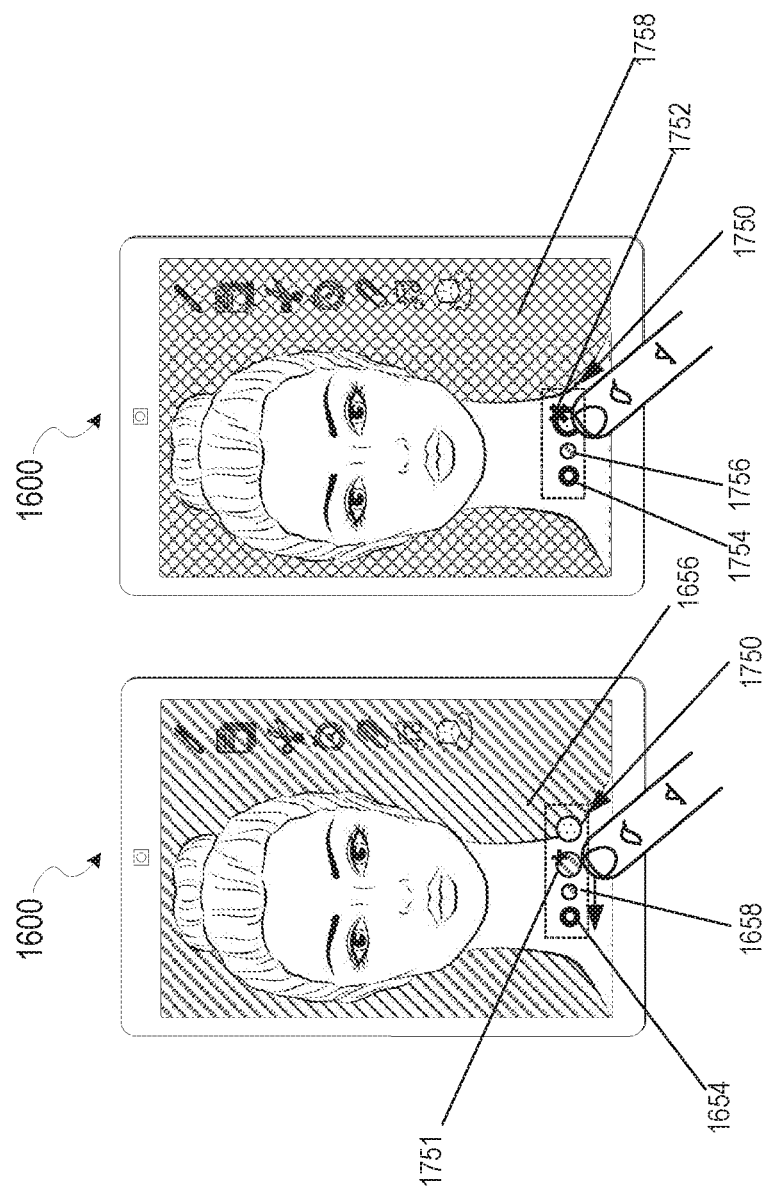
FIG. 17 illustrates additional examples of user interfaces (e.g., carousel) for selecting and stacking multiple media overlays for applying post-processing to media content (e.g., an image or video) in the messaging client application (or the messaging system), according to some embodiments.

FIG. 17 illustrates additional examples of user interfaces (e.g., carousel) for selecting and stacking multiple media overlays for applying post-processing to media content (e.g., an image or video) in the messaging client application 104 (or the messaging system 100), according to some embodiments. FIG. 17 is discussed by reference to FIG. 16 as the examples of FIG. 17 are provided in conjunction with the examples of FIG. 16.

In the examples shown in FIG. 17, the user interface 1600 as described above in FIG. 16 is provided for display on the display screen of an electronic device (e.g., the client device 102).

In a first example of FIG. 17, continuing from the fourth example discussed in FIG. 16, a selectable graphical item 1751 is included in selectable graphical items 1750, corresponding to a carousel arrangement, as displayed in the user interface 1600. As further shown, the third selectable graphical item 1654 and the fourth selectable graphical item 1658 previously discussed in FIG. 16 are included in the selectable graphical items 1750 of FIG. 17. In this example, the selectable graphical item 1751, which based on the graphical indication, belongs to the same group of media overlays as the fourth selectable graphical item 1658 (which was not selected as discussed above). The user provides a further gesture input (e.g., swipe or drag gesture) to scroll through other selectable graphical items 1750 corresponding to different media overlays.

In a second example of FIG. 17, the user continues the swipe or drag gesture which results in a display of a selectable graphical item 1752 in the user interface 1600. The selectable graphical item 1752, which based on the graphical indication, belongs to a different group of media overlays than the group of media overlays corresponding to the selectable graphical item 1751 and the fourth selectable graphical item 1658. In an embodiment, due to display area restrictions of the carousel arrangement, the user interface 1600 displays a selectable graphical item 1756 that represents the group of media overlays including the selectable graphical item 1751 and the fourth selectable graphical item 1658. Further, in the carousel arrangement, the user interface 1600 includes a selectable graphical item 1754 that represents the group of media overlays including the selectable graphical item 1651, the second selectable graphical item 1652, and the third selectable graphical item 1654 (which was previous selected to apply the media overlay 1656).

In this second example, the user provides a subsequent input (e.g., a tap or press) in order to apply the media overlay corresponding to the selectable graphical item 1752. To provide layering (e.g., stacking) of different media overlays, a media overlay 1758 is applied in response to the subsequent input, where the media overlay 1758 is provided for display in the user interface 1600 in conjunction with the displayed media overlay 1656. After applying the media overlay 1758, the user interface 1600 provides an indication that the selectable graphical item 1752 was previously selected (e.g., by highlighting the selectable graphical item 1752).

The following discussion relates to examples of different types of media overlays in accordance with some embodiments of the subject technology. In an example, a media overlay type indicates a particular category which can be utilized for grouping an associated media overlay. As discussed above, such a grouping of media overlays can then be presented in a carousel arrangement interface where selectable graphical items are included for selecting one or more media overlays, which can be stacked or applied or layered in combination as part of post-processing media content. The example media overlays illustrated in the discussion of the following figures can be selected for inclusion in respective groups, based on the aforementioned ranking and/or selection techniques, within the carousel interface discussed above in FIG. 16 and FIG. 17.

Figure 18:
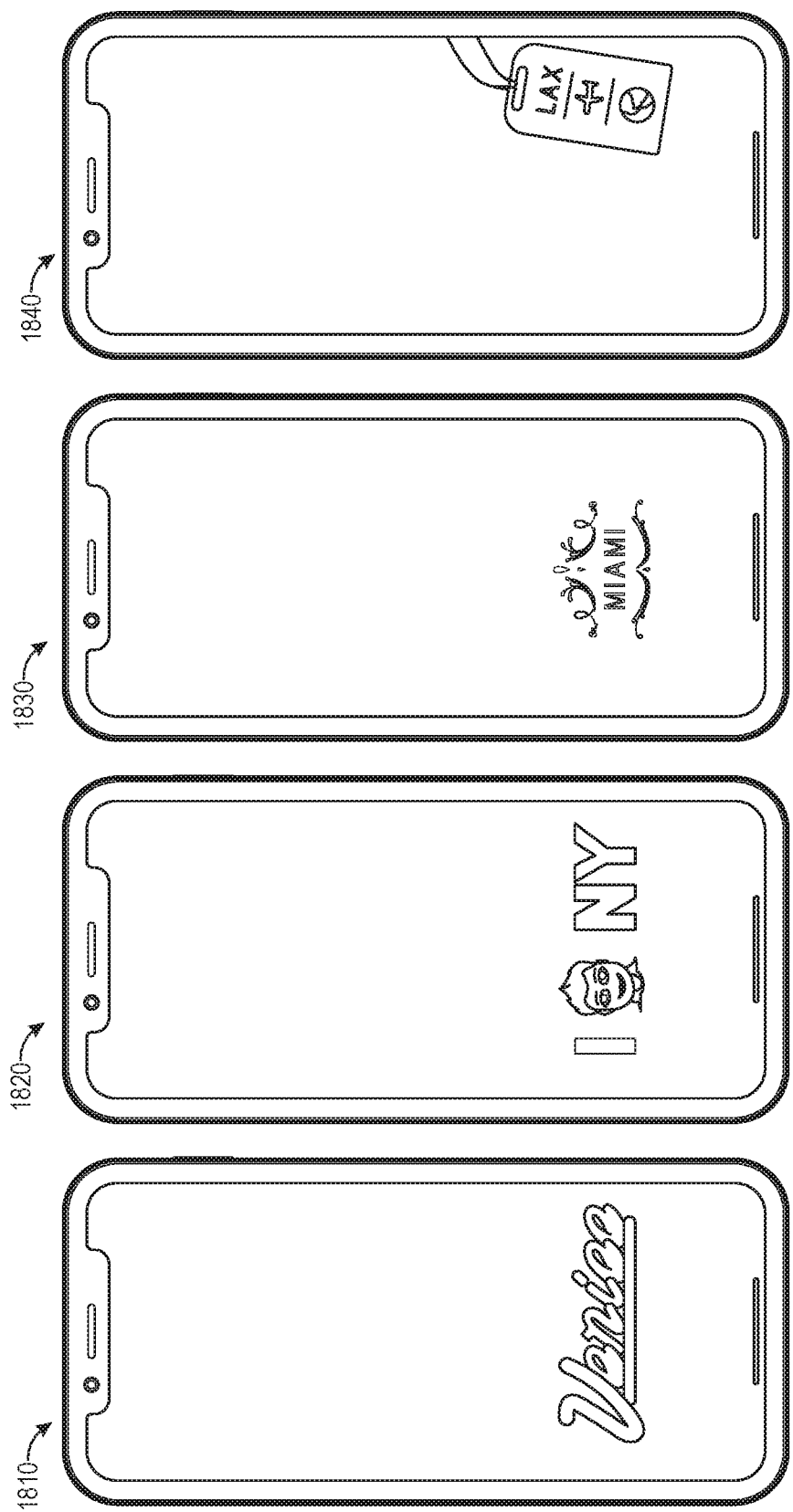
FIG. 18 illustrates examples of media overlays that can be selected to apply on media content during post-processing.

FIG. 18 illustrates examples of media overlays that can be selected to apply on media content during post-processing. As illustrated, a set of geolocation-based media overlays are shown in the examples of FIG. 18 including media overlay 1810, media overlay 1820, media overlay 1830, and media overlay 1840. Such geolocation media overlays, in at least some embodiments, includes static media overlays specific to a geolocation, or dynamic media overlays with location.

Figure 19:
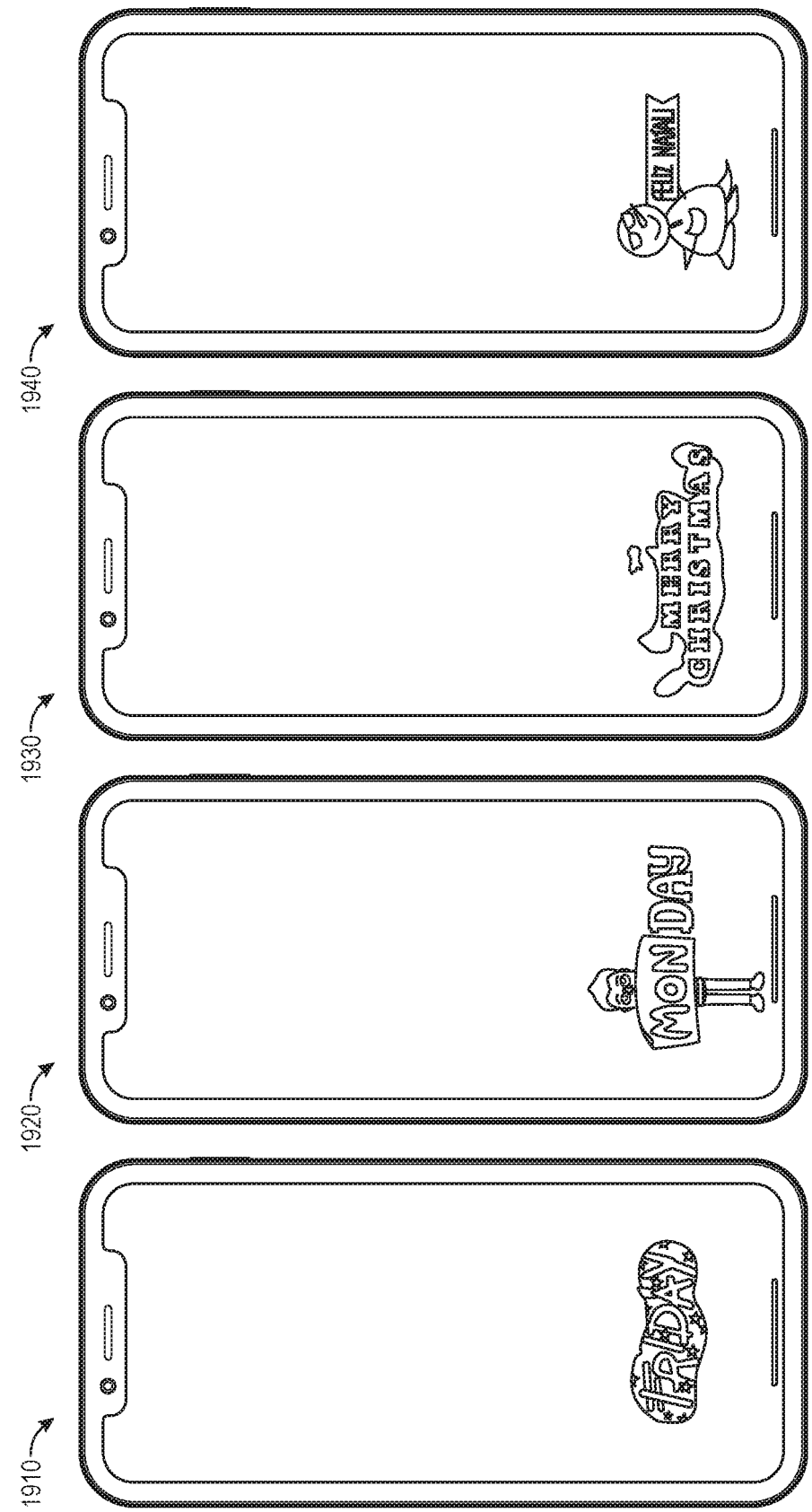
FIG. 19 illustrates examples of media overlays that can be selected to apply on media content during post-processing.

FIG. 19 illustrates examples of media overlays that can be selected to apply on media content during post-processing. As illustrated, a set of day-based media overlays are shown in the examples of FIG. 19 including media overlay 1910, media overlay 1920, media overlay 1930, and media overlay 1940. Such day media overlays, in at least some embodiments, includes media overlays that indicate the day (e.g., a particular day of the week, or a holiday, and the like), or media overlays with relevance to the particular current day.

Figure 20:
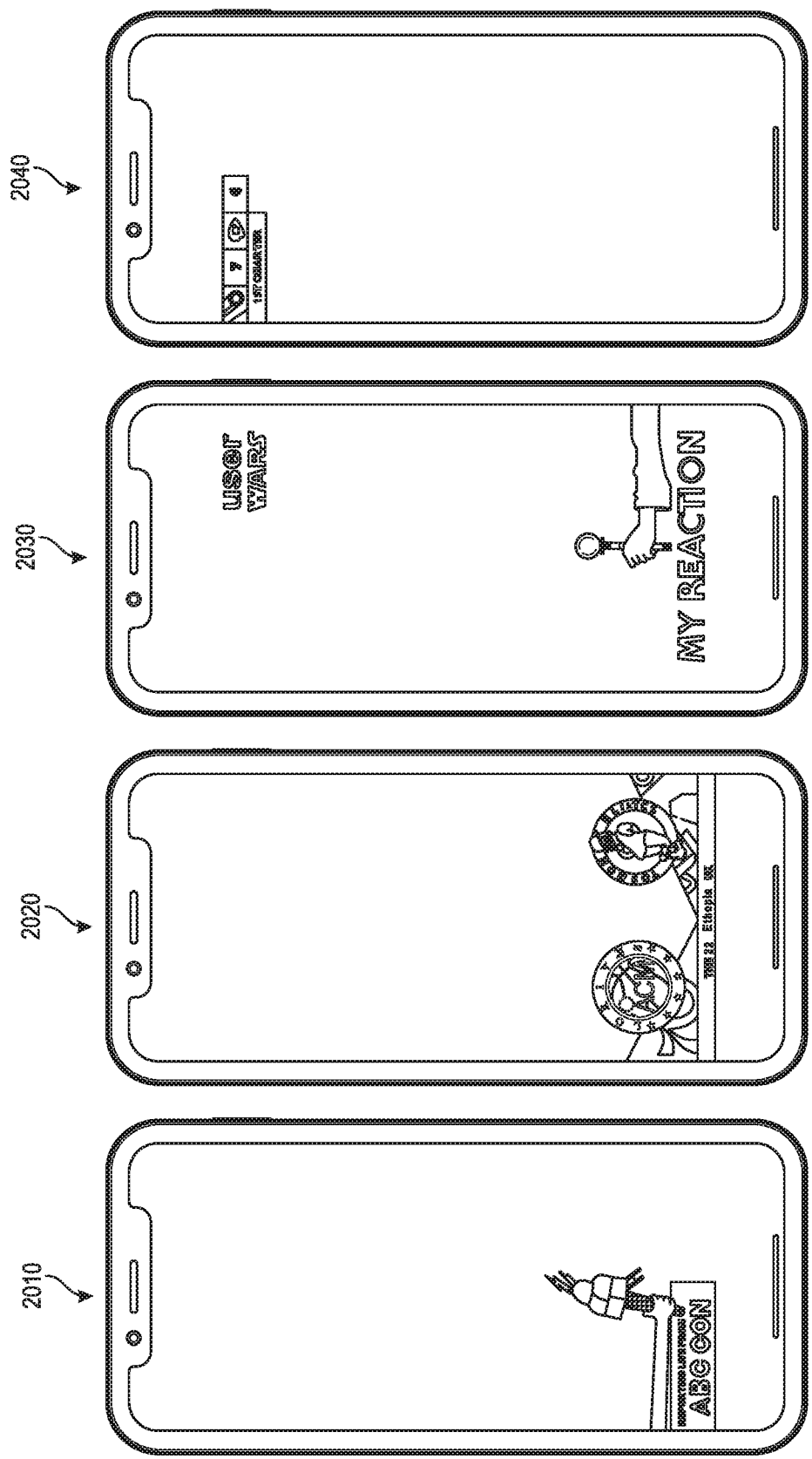
FIG. 20 illustrates examples of media overlays that can be selected to apply on media content during post-processing.

FIG. 20 illustrates examples of media overlays that can be selected to apply on media content during post-processing.

As illustrated, a set of event-based media overlays are shown in the examples of FIG. 20 including media overlay 2010, media overlay 2020, media overlay 2030, and media overlay 2040. Such event media overlays, in at least some embodiments, includes media overlays for a specific event, media overlays utilized for live story production, sports (e.g., sports teams and the like) media overlays, and media overlays that are flighted (e.g., activated) to smaller areas and shorter time frames.

Figure 21:
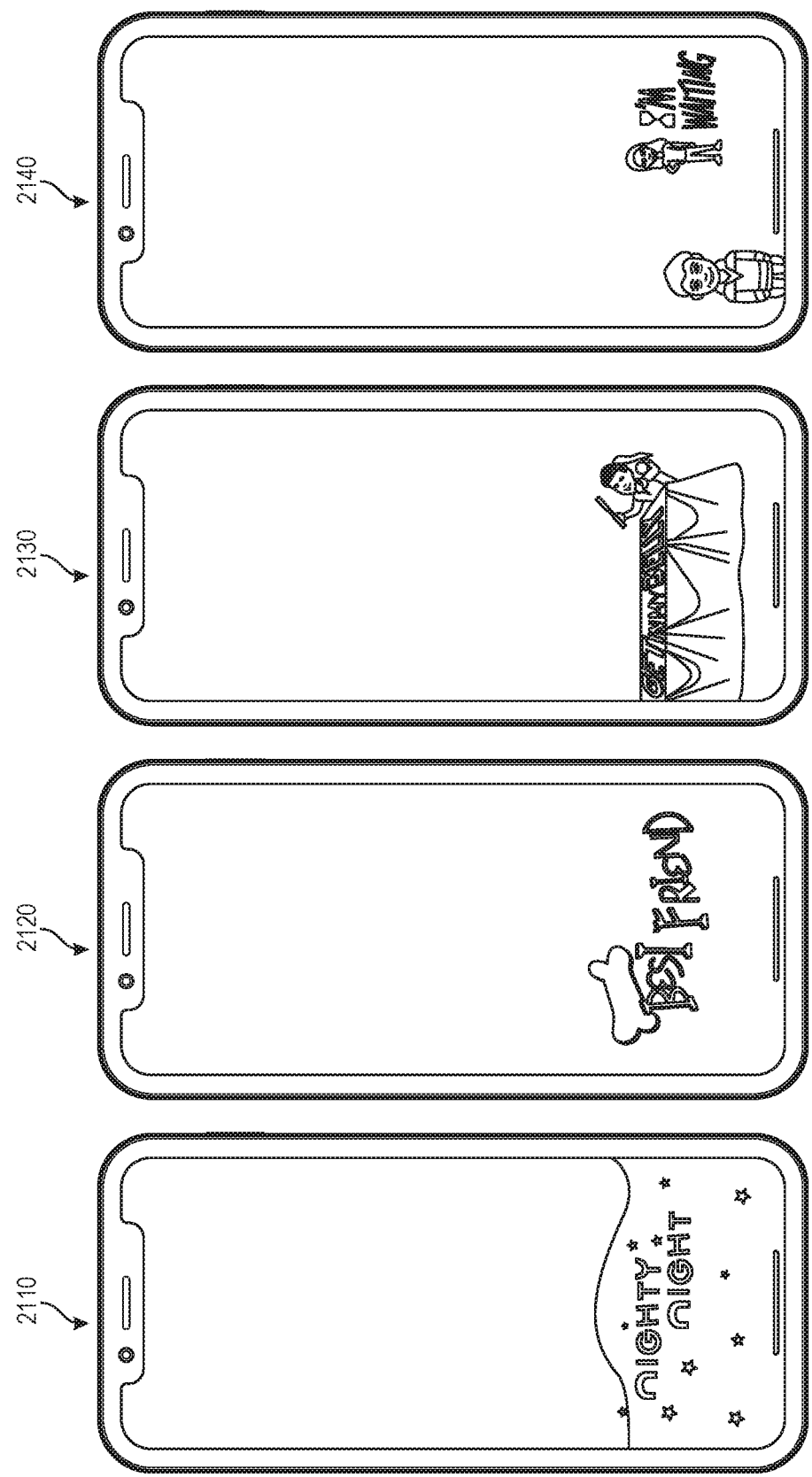
FIG. 21 illustrates examples of media overlays that can be selected to apply on media content during post-processing.

FIG. 21 illustrates examples of media overlays that can be selected to apply on media content during post-processing. As illustrated, a set of moment-based media overlays are shown in the examples of FIG. 21 including media overlay 2110, media overlay 2120, media overlay 2130, and media overlay 2140. Such moment media overlays, in at least some embodiments, includes hyper contextual media overlays for a particular message, media overlays that are flighted (e.g., activated) for shorter time frames and/or specific purpose, media overlays that have advanced targeting conditions including friend/social network media overlays (e.g., a friend is used as a context), time-based (morning/night), visual context based, deep link (e.g., specifying a location in an app defined by the deep link), and the like.

Figure 22:
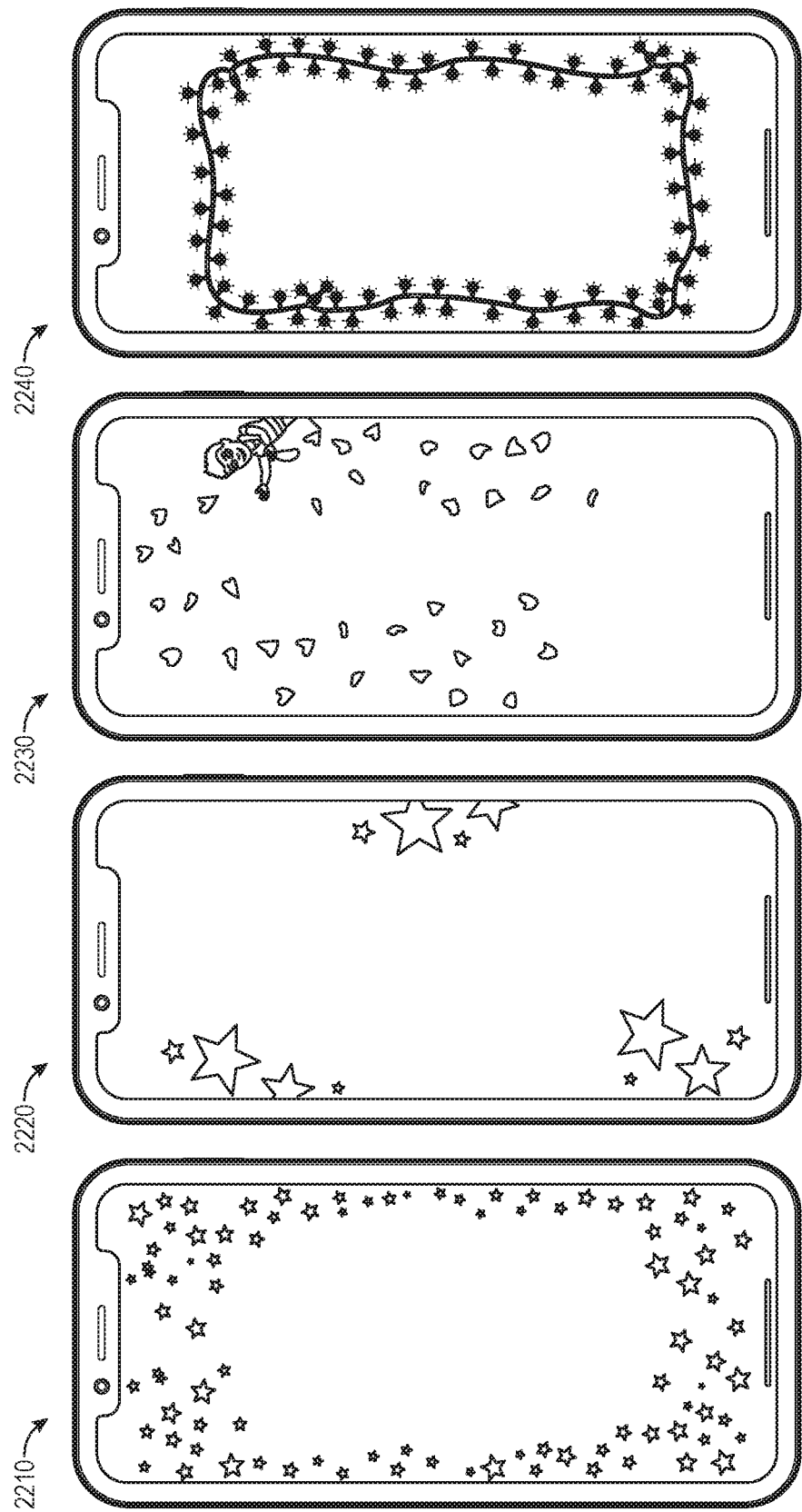
FIG. 22 illustrates examples of media overlays that can be selected to apply on media content during post-processing.

FIG. 22 illustrates examples of media overlays that can be selected to apply on media content during post-processing. As illustrated, a set of decorative based media overlays are shown in the examples of FIG. 22 including media overlay 2210, media overlay 2220, media overlay 2230, and media overlay 2240. Such decorative media overlays, in at least some embodiments, includes non-message based media overlays where a primary purpose is decoration, absent of words or expression, and can be flighted at any time, and/or anywhere, and also flighted seasonal in some instance.

Figure 23:
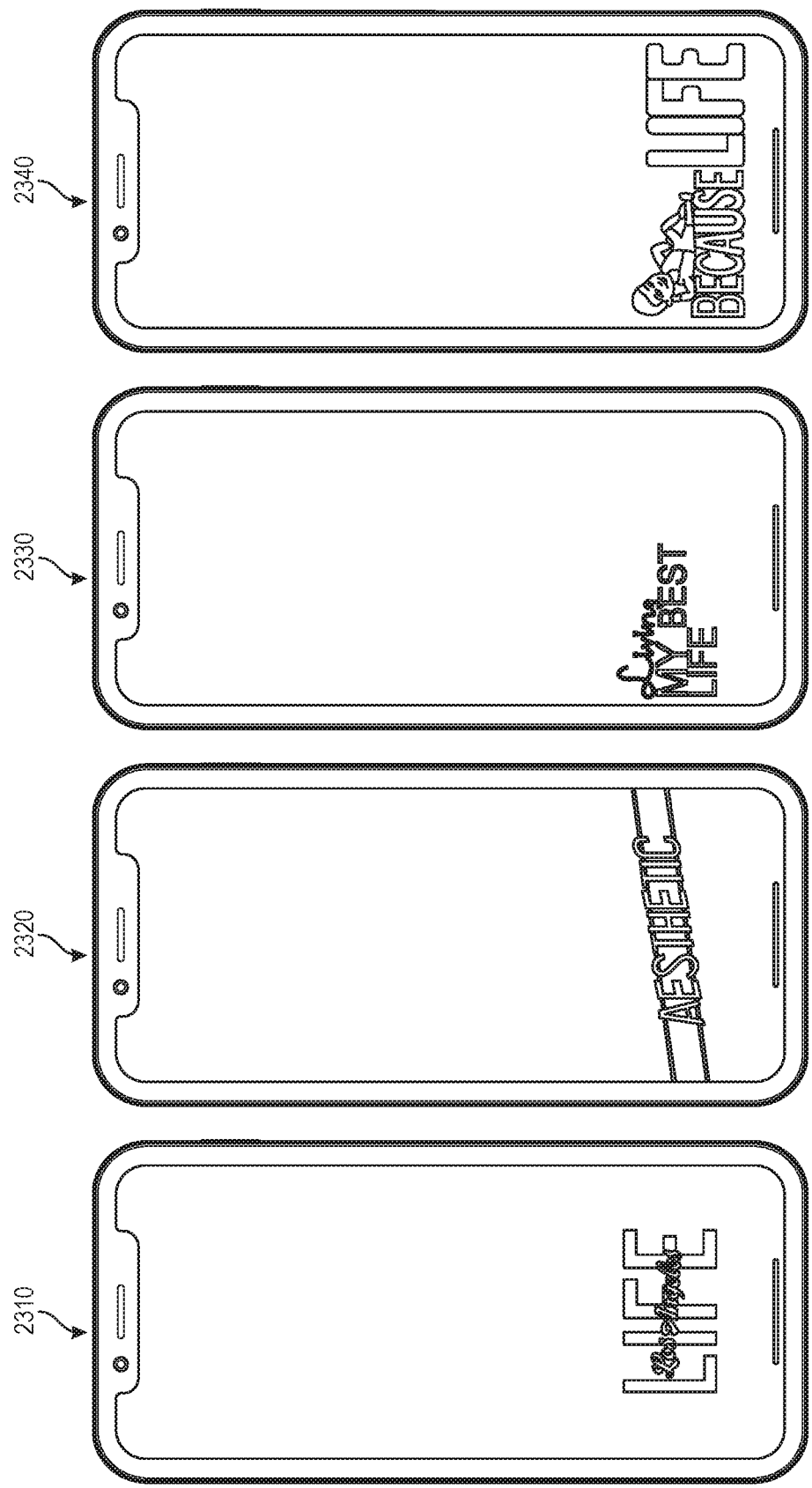
FIG. 23 illustrates examples of media overlays that can be selected to apply on media content during post-processing.

FIG. 23 illustrates examples of media overlays that can be selected to apply on media content during post-processing. As illustrated, a set of vibe-based media overlays are shown in the examples of FIG. 23 including media overlay 2310, media overlay 2320, media overlay 2330, and media overlay 2340. Such vibe media overlays, in at least some embodiments, includes media overlays that are have general, non-contextual expressions, contains expressive copy, often targeted towards emotions/vibes, and can be flighted at any time in a particular locale or geolocation.

Figure 24:
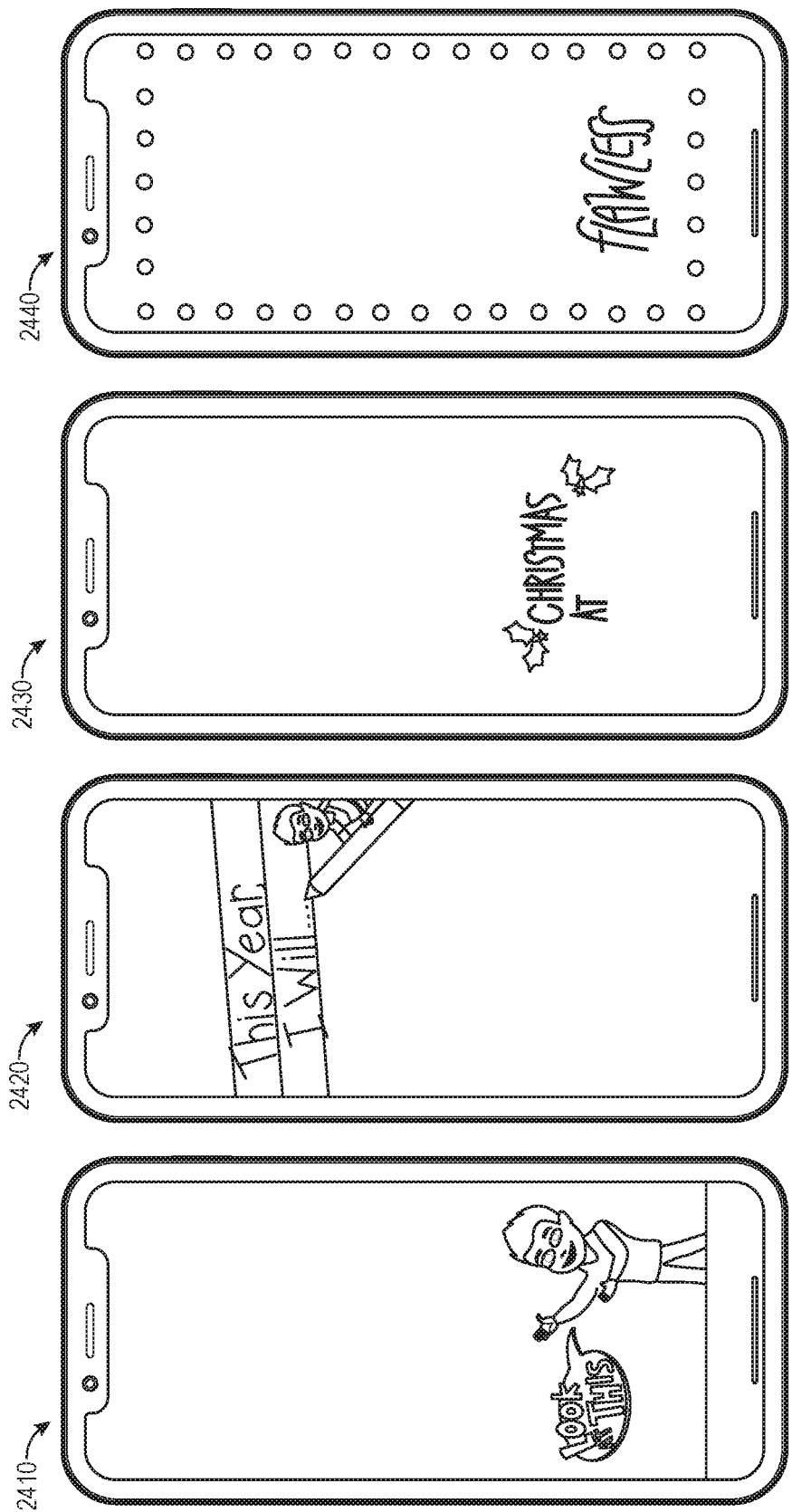
FIG. 24 illustrates examples of media overlays that can be selected to apply on media content during post-processing.

FIG. 24 illustrates examples of media overlays that can be selected to apply on media content during post-processing. As illustrated, a set of personal based media overlays are shown in the examples of FIG. 24 including media overlay 2410, media overlay 2420, media overlay 2430, and media overlay 2440. Such personal media overlays, in at least some embodiments, includes media overlays that are personalized to the user, can include a BITMOJI (e.g., respective user icon or user avatar), user's name, or is suitable for selfies (e.g., self-portraits using a front facing).

Figure 25:
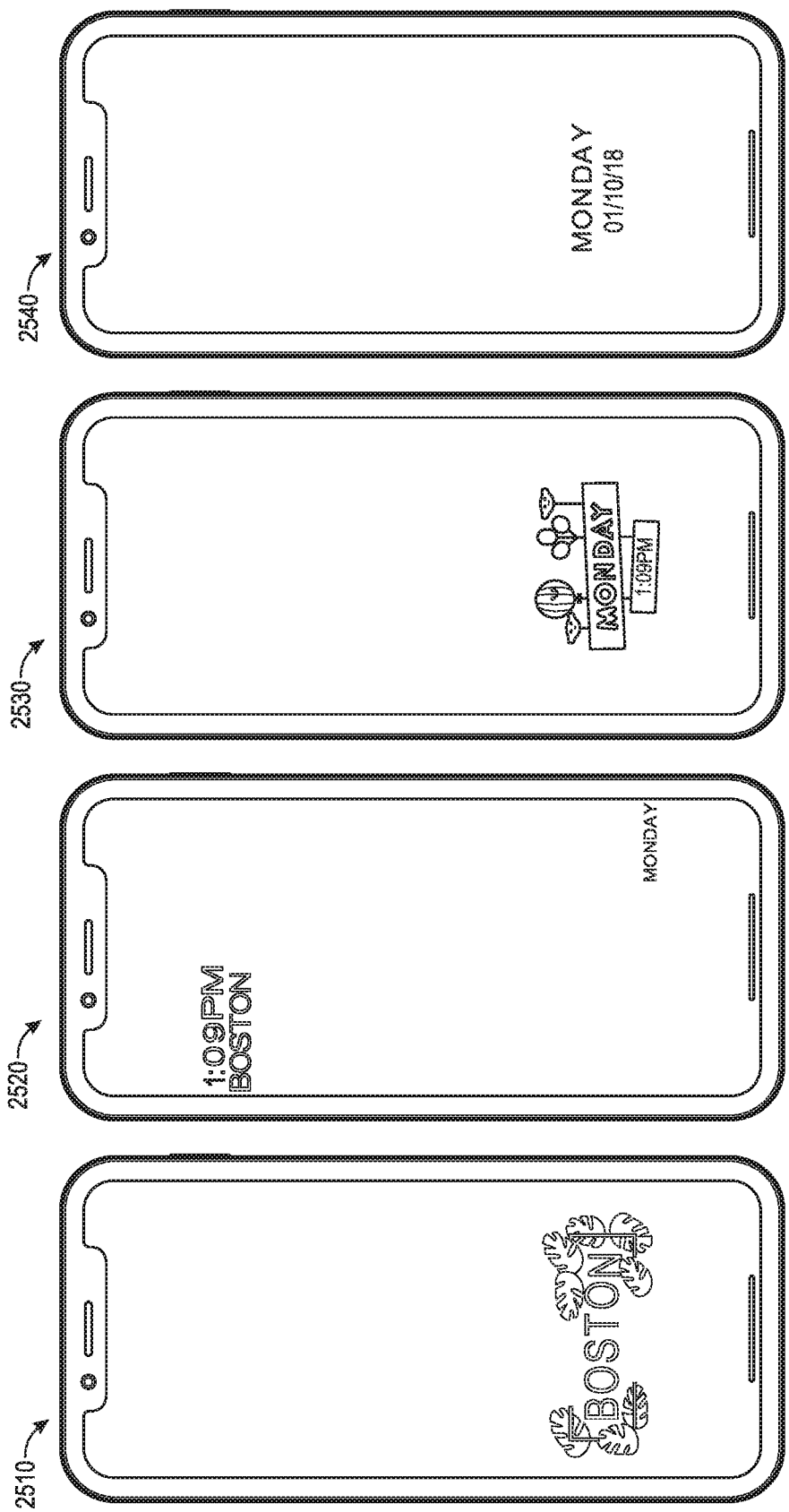
FIG. 25 illustrates examples of media overlays that can be selected to apply on media content during post-processing.

FIG. 25 illustrates examples of media overlays that can be selected to apply on media content during post-processing. As illustrated, a set of info template-based media overlays are shown in the examples of FIG. 25 including media overlay 2510, media overlay 2520, media overlay 2530, and media overlay 2540. Such info template media overlays, in at least some embodiments, includes media overlays with a combination of dynamic text as main content of media overlay, having minimal or no direct message aside from dynamic text, and can have a decorative, minimal, or no template background.

Figure 26:
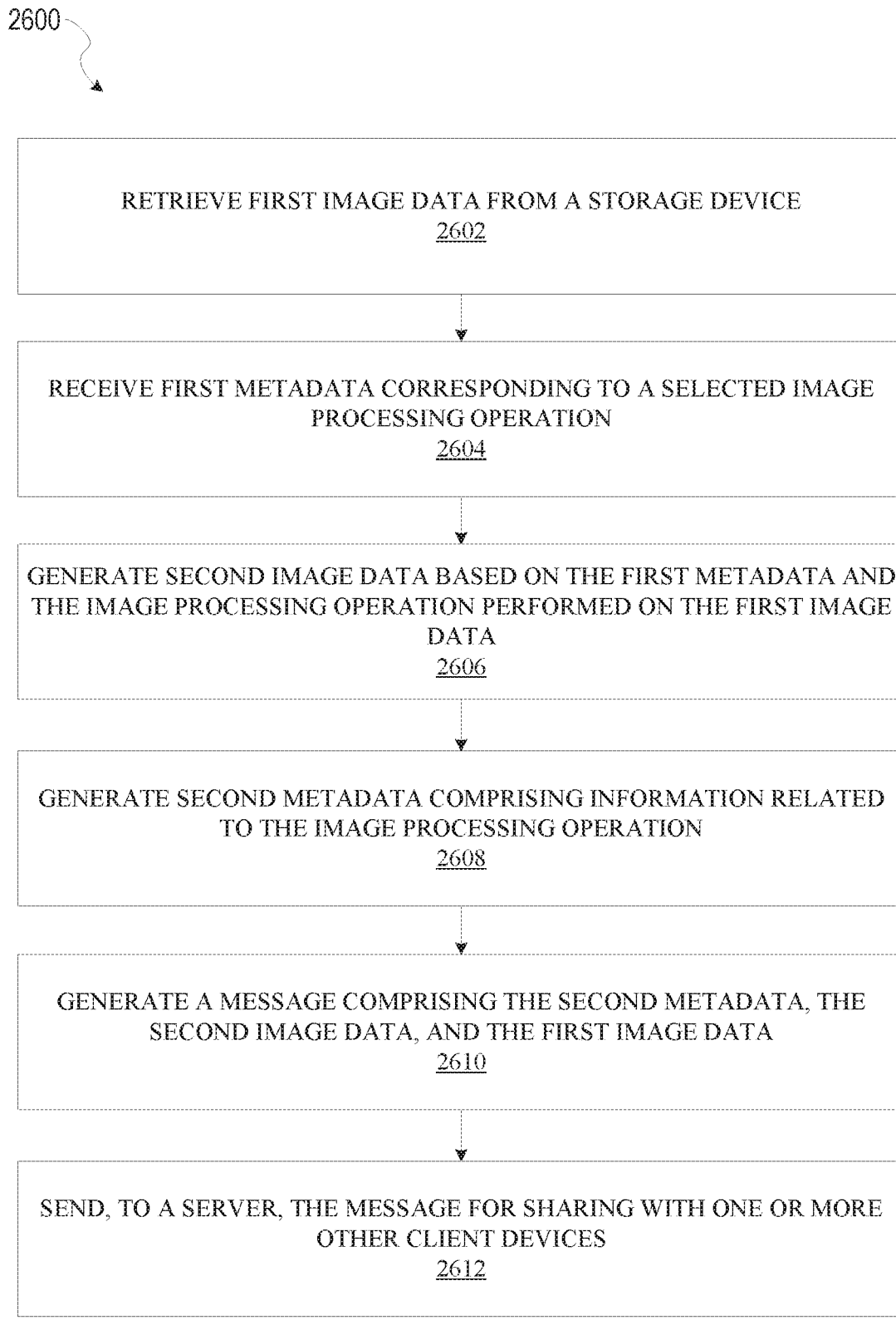
FIG. 26 is a flowchart illustrating a method to generate a message based on at least one post-processing operation on image data, according to certain example embodiments.

FIG. 26 is a flowchart illustrating a method 2600 to generate a message based on at least one post-processing operation on image data, according to certain example embodiments. The method 2600 may be embodied in computer-readable instructions for execution by one or more computer processors such that the operations of the method 2600 may be performed in part or in whole by the messaging client application 104, particularly with respect to respective components of the annotation system 206 described above in FIG. 6; accordingly, the method 2600 is described below by way of example with reference thereto. However, it shall be appreciated that at least some of the operations of the method 2600 may be deployed on various other hardware configurations and the method 2600 is not intended to be limited to the messaging client application 104.

At operation 2602, the post-processing engine 620 retrieves first image data from a storage device. The first image data may be an image such as a photograph or frame of a video captured by the electronic device at a previous time. For example, as described above with respect to at least FIG. 6, the first image data is captured by the client device 102 at a previous time, stored to the storage device, and later retrieved by the post-processing engine 620.

At operation 2604, the post-processing engine 620 receives first metadata corresponding to a selected image processing operation (e.g., media overlay). Such metadata may be stored with and/or generated by the client device 102 (or stored in the database 102) in order to enable post-processing of media content (e.g., as described in FIG. 6 and FIG. 7). For example, as described before in respect to at least FIG. 6 and FIG. 7, metadata or information corresponding to a media overlay to be applied to media content (e.g., the first image data) is provided (e.g., either by the client 102 and/or the messaging server system 108) during post-processing to enable performing the selected image processing operation. Moreover, the selected image processing operation is selected via a display of the client device (e.g., using a swipe gesture as described, for example, in at least FIG. 11, FIG. 12, FIG. 16, and FIG. 17). In an embodiment, the selected image processing operation corresponds to a media overlay that belongs to a particular group of media overlays based on a category associated with the media overlay.

At operation 2606, the post-processing engine 620 generates second image data based at least in part on the first metadata and the image processing operation performed on the received first image data. For example, as described before in at least FIG. 9A, FIG. 9B, FIG. 10A, FIG. 10B, FIG. 16, and FIG. 17, the client device 102 applies an image processing operation corresponding to a selected media overlay to media content (e.g., to enable a rendering of the applied media overlay on the display screen of the client device 102). The rendering engine 630 renders, for display by the client device, the second image data comprising a first image corresponding to the first image data modified by the selected image processing operation, as described before in at least FIG. 6.

In a further example, the post-processing engine 620 receives sensor data including an orientation of the client device 102 corresponding to the first image data, the sensor data including metadata associated with the first image data, where generating second image data is further based on the sensor data, the received sensor data indicating an orientation of the client device 102. For example, using a particular tracking engine (e.g., provided by the tracking engine 610) with the sensor data, the post-processing engine 620 detects the device orientation from the sensor data and then generates the second image data in a format to fit the device orientation and/or to appropriately provide augmentation of the first image data to thereby generate the second image data. The post-processing engine 620 can store the second image data separately from the first image data in an embodiment.

In another example, the first image data includes a representation of an environment. The post-processing engine 620 performs a tracking process based on the first image data. The tracking process can be tracking a surface recognized in the representation of the environment, tracking a face recognized in the representation of the environment, tracking an object using a machine learning model, and so forth. In one example embodiment, only one tracking process is performed at a time by the post-processing engine 620.

At operation 2608, the post-processing engine 620 generates second metadata comprising information related to the image processing operation (e.g., media overlay). For example, the second metadata comprises a first identifier associated with the first image data, and second identifier associated with the second image data, and/or other metadata which is described before with respect to at least FIG. 7. Further, the second metadata, in some embodiments, can include the following information to indicate that the image processing occurred during a post-processing stage: gesture information (e.g., swipe direction), gesture sequence count (e.g., number in a sequence or series of swipes), tap count (e.g., number of tap/touch inputs received), media overlay name, media overlay type (e.g., classification indicator), media overlay index, number of media overlays, media overlay score (e.g., relevance indicator), media overlay group, and the like.

At operation 2610, the sharing engine 640 generates a message comprising the second metadata, the second image data, and the first image data. For example, such a message can include each of the aforementioned information, which described before in respect to at least FIG. 7.

At operation 2612, the sharing engine 640 sends, to a server (e.g., the messaging server system 108), the message for sharing with one or more other client devices. For example, the sharing engine 640 sends such a message as described before in respect to at least FIG. 6.

Figure 27:
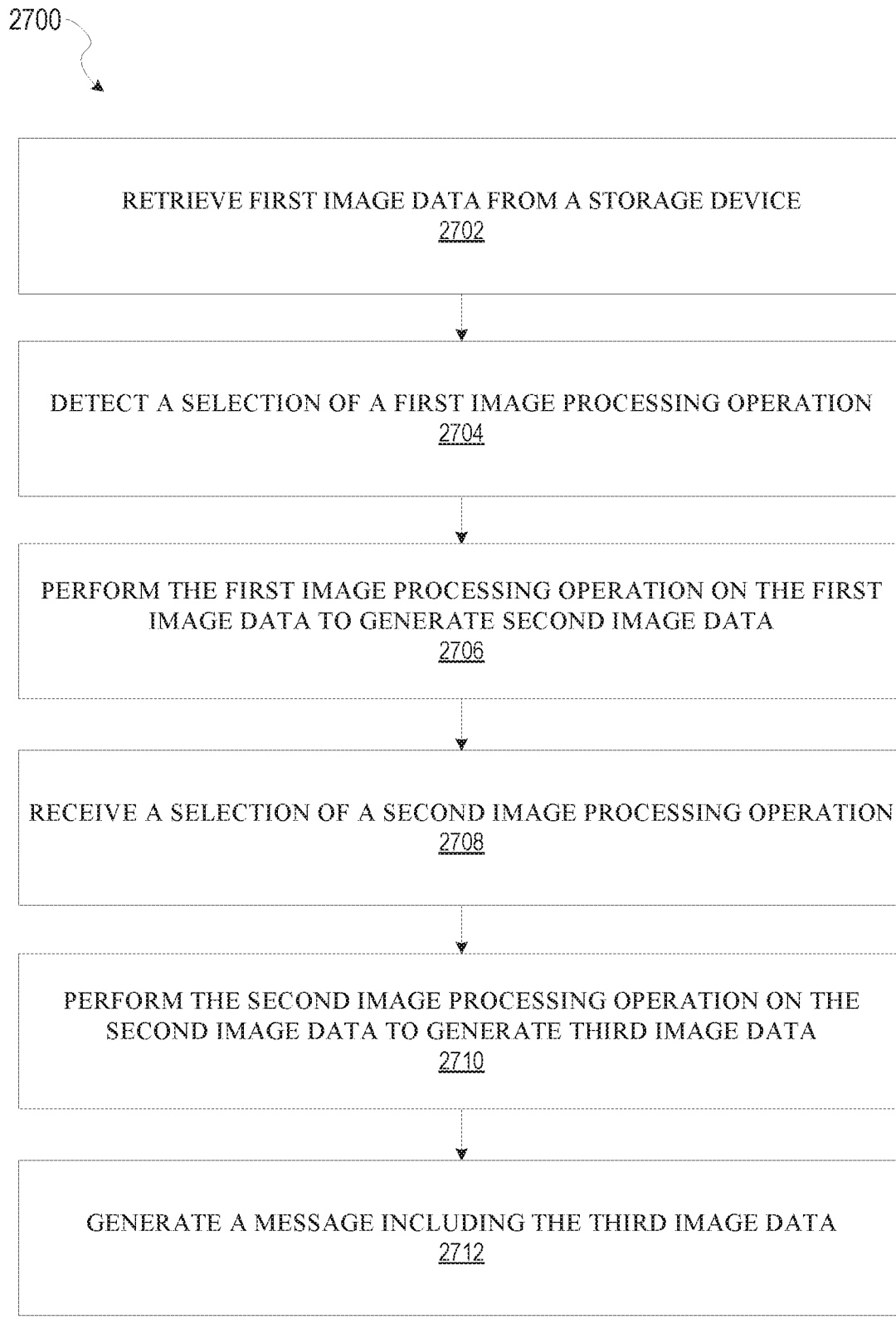
FIG. 27 is a flowchart illustrating a method to generate a message based on layering of post-processing operations on image data, according to certain example embodiments.

FIG. 27 is a flowchart illustrating a method 2700 to generate a message based on layering of post-processing operations on image data, according to certain example embodiments. The method 2700 may be embodied in computer-readable instructions for execution by one or more computer processors such that the operations of the method 2700 may be performed in part or in whole by the messaging client application 104, particularly with respect to respective components of the annotation system 206 described above in FIG. 6; accordingly, the method 2700 is described below by way of example with reference thereto. However, it shall be appreciated that at least some of the operations of the method 2700 may be deployed on various other hardware configurations and the method 2700 is not intended to be limited to the messaging client application 104.

At operation 2702, the post-processing engine 620 retrieves first image data from a storage device. As described above, the first image data is captured by the client device 102 at a previous time stored to the storage device, and later retrieved by the post-processing engine 620 in an example described in respect to at least FIG. 6.

At operation 2704, the post-processing engine 620 detects a selection of a first media overlay corresponding to a first image processing operation. For example, as described before in at least FIG. 11, FIG. 12, FIG. 16, and FIG. 17, a media overlay is selected by a user via an input (e.g., touch input, swipe gesture, and the like). Further, the selected first media overlay is associated with a particular group of media overlays based on a category associated with each of the media overlays.

At operation 2706, the post-processing engine 620 performs the first image processing operation corresponding to the first media overlay on the first image data to generate second image data. For example, as described before in at least FIG. 9A, FIG. 9B, FIG. 10A, and FIG. 10B, a selected media overlay is applied to media content (e.g., to enable a rendering of the applied media overlay on the display screen of the client device 102). Further, the first image processing operation is performed by a first layer of a graphical processing pipeline as described before in at least FIG. 13, FIG. 14, and FIG. 15.

At operation 2708, the post-processing engine 620 detects a selection of a second media overlay corresponding to a second image processing operation. For example, as described before in at least FIG. 16, and FIG. 17, a second media overlay can be selected by a user via an input (e.g., touch input, swipe gesture, and the like). Further, the second media overlay corresponding to the second image processing operation is associated with a second group of second media overlays based on a different category associated with the second media overlay.

At operation 2710, the post-processing engine 620 performs the second image processing operation on the second image data to generate third image data. For example, as described before in at least FIG. 16, and FIG. 17, a second media overlay can be applied to media content that has been processed before (e.g., with the first media overlay) to provide layering of media overlays to the media content. Further, the second image processing operation is performed by a second layer of the graphical processing pipeline as described before in at least FIG. 13, FIG. 14, and FIG. 15. The second layer is executed after the first layer in an embodiment.

At operation 2712, the sharing engine 640 generates a message comprising the third image data As described before in at least FIG. 6, FIG. 7, FIG. 13. FIG. 14, FIG. 15, FIG. 16, and FIG. 17, multiple media overlays can be applied on media content to provide a composite image, which at least includes a combination of the applied media content. The sharing engine 640 can send the generated message to a server (e.g., the messaging server system 108) for sharing with one or more other client devices.

Figure 28:
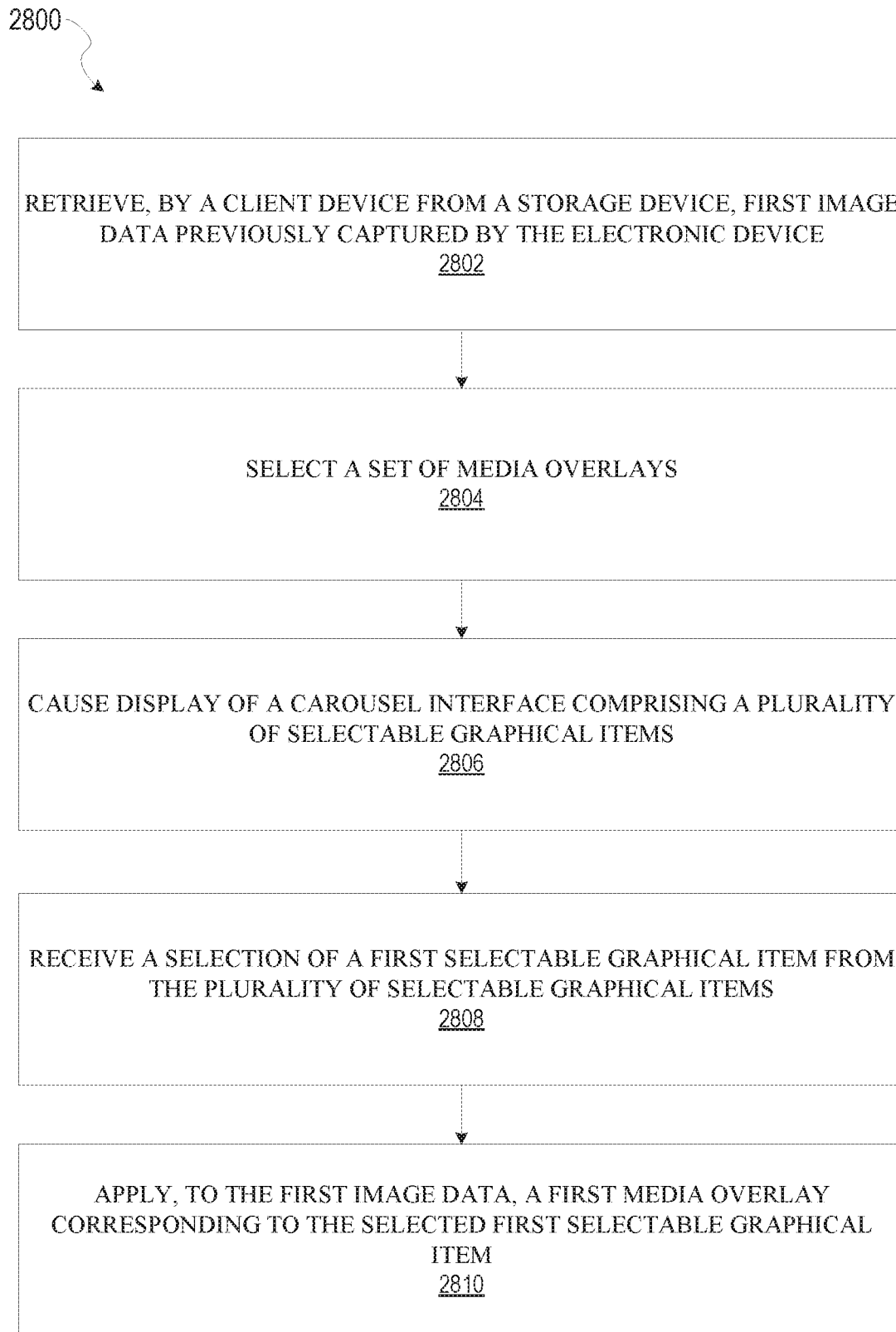
FIG. 28 is a flowchart illustrating a method to provide a carousel interface for post-processing operations, according to certain example embodiments.

FIG. 28 is a flowchart illustrating a method 2800 to provide a carousel interface for post-processing operations, according to certain example embodiments. The method 2800 may be embodied in computer-readable instructions for execution by one or more computer processors such that the operations of the method 2800 may be performed in part or in whole by the messaging client application 104, particularly with respect to respective components of the annotation system 206 described above in FIG. 6; accordingly, the method 2800 is described below by way of example with reference thereto. However, it shall be appreciated that at least some of the operations of the method 2800 may be deployed on various other hardware configurations and the method 2800 is not intended to be limited to the messaging client application 104.

At operation 2802, the post-processing engine 620 retrieves, by a client device from a storage device, first image data previously captured by the client device (e.g., the client device 102). As described above, the first image data is captured by the client device 102 at a previous time, stored to the storage device, and later retrieved by the post-processing engine 620 in an example described in at least FIG. 6. The first image data is then displayed on the display screen of the client device 102 in some embodiments.

At operation 2804, the post-processing engine 620 selects a set of media overlays in response to displaying the first image data. In an example, each respective media overlay is associated with a category indicator. The client device 102 matches the category indicator among respective media overlays to determine one or more groupings of media overlays based on the respective category indicators. The client device 102 selects one of the groupings for the selected set of media overlays, as described before in at least FIG. 16 and FIG. 17. In another example, the client device 102 selects multiple groups of media overlays.

In an embodiment, each respective media overlay is associated with a score which may correspond to an indicator of relevancy for each respective media overlay (e.g., higher score indicating higher relevancy, and lower score indicator lower relevancy). As discussed before, the indicator of relevancy can be based on an initial default score or value, and then adjusted higher or lower based on one or more signals (e.g., geolocation, time or date, usage, object of interest in the image data, and the like). The post-processing engine 620 ranks the media overlays based on the respective score associated with each media overlay. In this example, the post-processing engine 620 selects a predefined number of highest ranked media overlays as the set of media overlays. In another embodiment, the ranking is instead performed by components of the messaging server system 108 and a set of selected media overlays based on the determined ranking can be subsequently provided to the post-processing engine 620 for processing in the manner described above. In an example where a single grouping of media overlays has been selected (e.g., based on a sole matching category indicator), the ranking can be performed on the respective scores of each media overlay within this same single grouping. In an example where multiple groupings of media overlays have been selected (e.g., based on different category indicators), the ranking can be performed on the respective scores of each media overlay within each respective grouping of media overlays.

At operation 2806, the post-processing engine 620 causes display of a carousel interface including selectable graphical items (e.g., the user interface 1600). Each selectable graphical item of the selectable graphical items corresponds to a respective media overlay of the set of media overlays. In an embodiment, the selectable graphical items are provided in the carousel interface based at least in part on the aforementioned ranking of media overlays where the top ranked media overlays are selected for display. Thus, it is appreciated that each selectable graphical item in the carousel interface can correspond to one of the top ranked media overlays. Moreover, as described in respect to at least FIG. 16, and FIG. 17, the carousel interface is presented on the display screen of the client device 102. As described before, multiple groupings of media overlays can be provided for display in the carousel interface, and respective media overlays from particular groupings (e.g., based on matching category indicators) are provided for display based on the aforementioned ranking (e.g., where top ranked media overlays are provided for display). In an example, the user interface 1600 provides a visual indicator that distinguishes the selected first selectable graphical item from other selectable graphical items of the plurality of selectable graphical items that have not been selected. Additionally, the selected first selectable graphical item is within a first display area and the first display area is different from a second display area where the other selectable graphical items of the plurality of selectable graphical items that have not been selected are presented.

At operation 2808, the post-processing engine 620 receives a selection of a first selectable graphical item from the plurality of selectable graphical items. For example, as described before in at least FIG. 16, and FIG. 17, a particular media overlay corresponding to a particular selectable graphical item can be selected by a user via an input (e.g., touch input, and the like).

At operation 2810, the post-processing engine 620 applies, to the first image data, a first media overlay corresponding to the selected first selectable graphical item. For example, as described before in at least FIG. 16, and FIG. 17, a selected media overlay can be applied to media content (e.g., to enable a rendering of the applied media overlay on the display screen of the client device 102).

Figure 29:
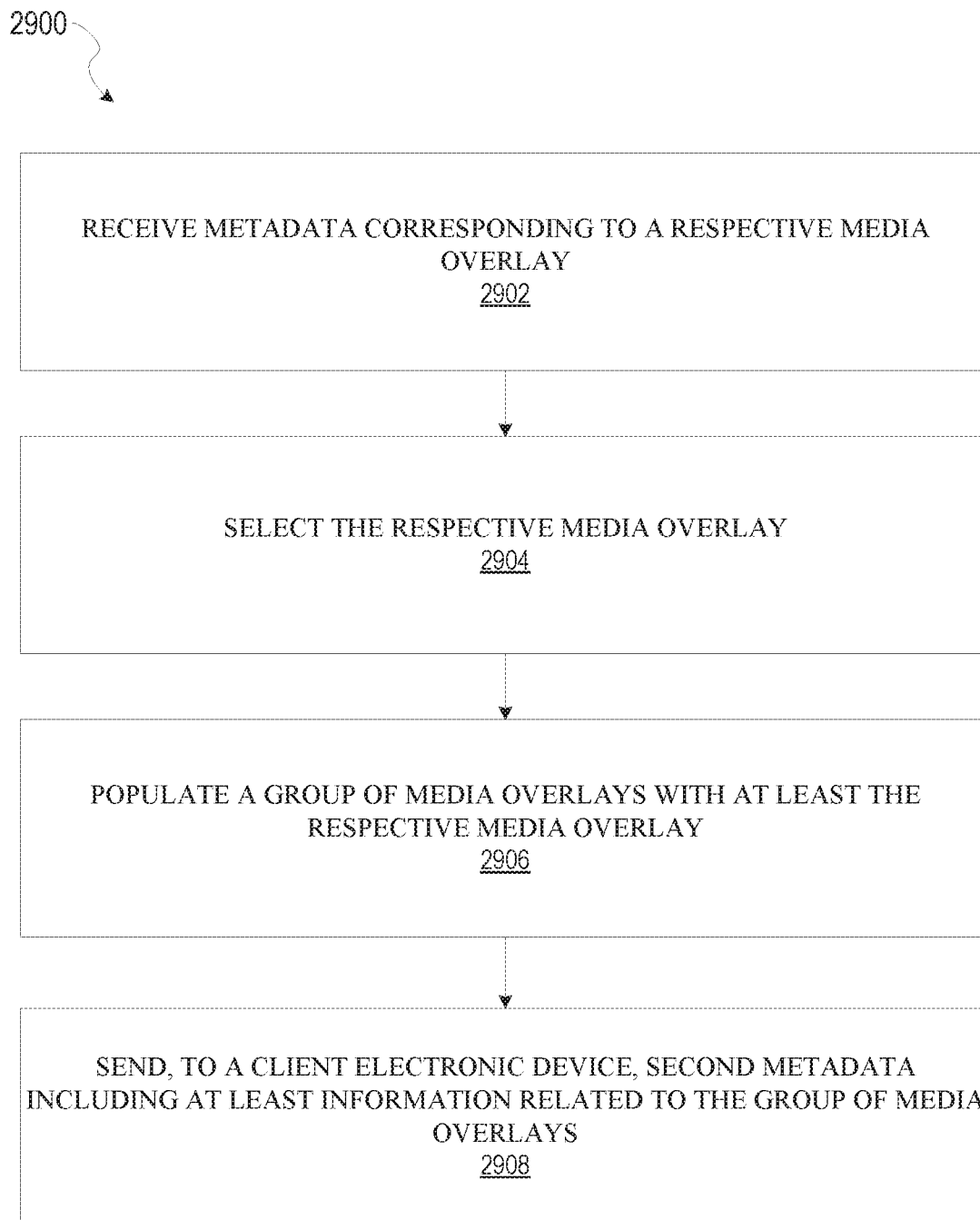
FIG. 29 is a flowchart illustrating a method to determine a set of media overlays for populating a set of media overlays that can be utilized by a client electronic device during a post-processing stage to modify media content, according to certain example embodiments.

FIG. 29 is a flowchart illustrating a method 2900 to determine a set of media overlays for populating a set of media overlays that can be utilized by a client electronic device during a post-processing stage to modify media content, according to certain example embodiments. The method 2900 may be embodied in computer-readable instructions for execution by one or more computer processors such that the operations of the method 2900 may be performed in part or in whole by the messaging server system 108; accordingly, the method 2900 is described below by way of example with reference thereto. However, it shall be appreciated that at least some of the operations of the method 2900 may be deployed on various other hardware configurations and the method 2900 is not intended to be limited to the messaging server system 108.

At operation 2902, the messaging server system 108 receives metadata corresponding to a media overlay. In an example, the metadata can be stored in database 120 accessible via the database server 118. Alternatively, the metadata is stored by the client 102 (e.g., as part of storage associated with the messaging client application 104). The metadata comprises information indicating that the media overlay is configured to be applied as an image processing operation during post-processing of image data during a post-capture stage. For example, as described before in at least FIG. 6, and FIG. 7, such metadata related to a media overlay may be utilized for enabling post-processing operations by the messaging server system 108.

At operation 2904, the messaging server system 108 selects the media overlay indicated in the metadata corresponding to the media overlay. For example, as described before in respect to at least FIG. 16, and FIG. 17, the messaging server system 108 determines that a media overlay is selected by determining whether a media overlay applicable context includes information indicating that the media overlay is considered a post-capture media overlay (e.g., can be previewed or rendered for display by the electronic device on media content during post-processing). In one example, the media overlay applicable context is determined by the messaging server system 108 by detecting that the client device 102 and/or the messaging client application 104 has accessed media content for modification during a post-capture time period, which in turn initiates an operation for populating the record of media overlays that is then utilized for selecting media overlays for presenting in a user interface (e.g., the user interface 1600).

At operation 2906, the messaging server system 108, based at least in part on a category indicator associated with the respective media overlay, populates a group of media overlays with at least the respective media overlay. For example, as described before in respect to at least FIG. 16 and FIG. 17, the messaging server system 108 determines a number of media overlays for including in the group of media overlays by determining that the group of media overlays includes a set of media overlays that is less than a particular number of media overlays corresponding to a maximum limit (or cap) of media overlays to include. Additionally, the messaging server system 108 determines a number of media overlays for including in the group of media overlays, and declines to include a particular media overlay based at least in part on determining that the group of media overlays includes a set of media overlays that meets the number of media overlays.

At operation 2908, the messaging server system 108 sends, to a client device, second metadata comprising information related to the group of media overlays. For example, the second metadata comprises information indicating that each media overlay in the group of media overlays corresponds to a same media overlay type. Alternatively, the information indicates that only a subset of media overlays from the group of media overlays corresponds to a same media overlay type. Also, in an example, the messaging server system 108 sends the second metadata comprising information related to the group of media overlays is in response to the client electronic device accessing a particular selectable graphical item in a carousel interface (e.g., the user interface 1600).

Figure 30:
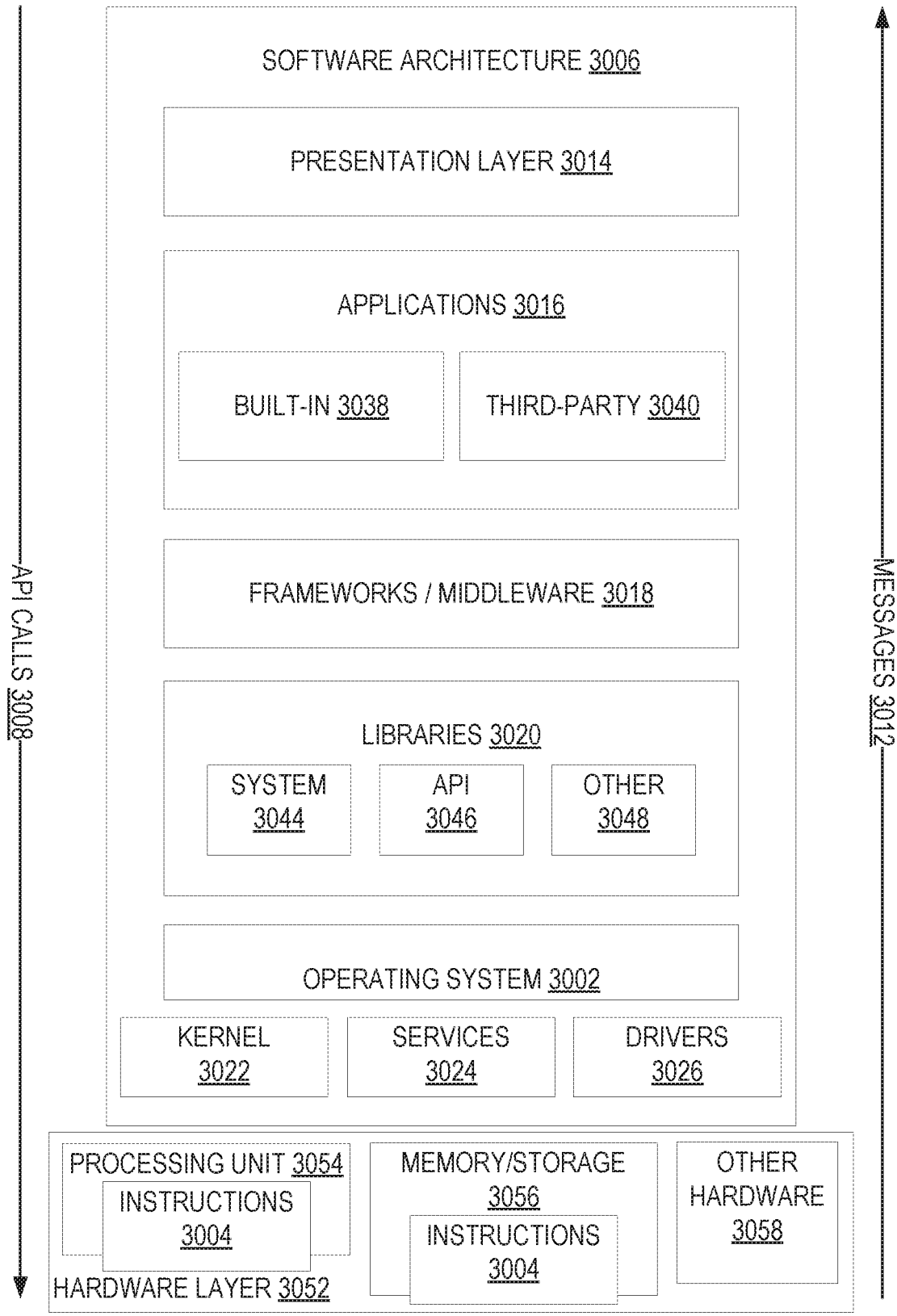
FIG. 30 is block diagram showing a software architecture within which the present disclosure may be implemented, in accordance with some example embodiments.

FIG. 30 is a block diagram illustrating an example software architecture 3006, which may be used in conjunction with various hardware architectures herein described. FIG. 30 is a non-limiting example of a software architecture and it will be appreciated that many other architectures may be implemented to facilitate the functionality described herein. The software architecture 3006 may execute on hardware such as machine 3100 of FIG. 31 that includes, among other things, processors 3104, memory 3114, and (input/output) I/O components 3118. A representative hardware layer 3052 is illustrated and can represent, for example, the machine 3100 of FIG. 31. The representative hardware layer 3052 includes a processing unit 3054 having associated executable instructions 3004. Executable instructions 3004 represent the executable instructions of the software architecture 3006, including implementation of the methods, components, and so forth described herein. The hardware layer 3052 also includes memory and/or storage modules memory/storage 3056, which also have executable instructions 3004. The hardware layer 3052 may also comprise other hardware 3058.

In the example architecture of FIG. 30, the software architecture 3006 may be conceptualized as a stack of layers where each layer provides particular functionality. For example, the software architecture 3006 may include layers such as an operating system 3002, libraries 3020, frameworks/middleware 3018, applications 3016, and a presentation layer 3014. Operationally, the applications 3016 and/or other components within the layers may invoke API calls 3008 through the software stack and receive a response as in response to the API calls 3008. The layers illustrated are representative in nature and not all software architectures have all layers. For example, some mobile or special purpose operating systems may not provide a frameworks/middleware 3018, while others may provide such a layer. Other software architectures may include additional or different layers.

The operating system 3002 may manage hardware resources and provide common services. The operating system 3002 may include, for example, a kernel 3022, services 3024, and drivers 3026. The kernel 3022 may act as an abstraction layer between the hardware and the other software layers. For example, the kernel 3022 may be responsible for memory management, processor management (e.g., scheduling), component management, networking, security settings, and so on. The services 3024 may provide other common services for the other software layers. The drivers 3026 are responsible for controlling or interfacing with the underlying hardware. For instance, the drivers 3026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 3020 provide a common infrastructure that is used by the applications 3016 and/or other components and/or layers. The libraries 3020 provide functionality that allows other software components to perform tasks in an easier fashion than to interface directly with the underlying operating system 3002 functionality (e.g., kernel 3022, services 3024 and/or drivers 3026). The libraries 3020 may include system libraries 3044 (e.g., C standard library) that may provide functions such as memory allocation functions, string manipulation functions, mathematical functions, and the like. In addition, the libraries 3020 may include API libraries 3046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 3020 may also include a wide variety of other libraries 3048 to provide many other APIs to the applications 3016 and other software components/modules.

The frameworks/middleware 3018 (also sometimes referred to as middleware) provide a higher-level common infrastructure that may be used by the applications 3016 and/or other software components/modules. For example, the frameworks/middleware 3018 may provide various graphic user interface (GUI) functions, high-level resource management, high-level location services, and so forth. The frameworks/middleware 3018 may provide a broad spectrum of other APIs that may be used by the applications 3016 and/or other software components/modules, some of which may be specific to a particular operating system 3002 or platform.

The applications 3016 include built-in applications 3038 and/or third-party applications 3040. Examples of representative built-in applications 3038 may include, but are not limited to, a contacts application, a browser application, a book reader application, a location application, a media application, a messaging application, and/or a game application. Third-party applications 3040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 3040 may invoke the API calls 3008 provided by the mobile operating system (such as operating system 3002) to facilitate functionality described herein.

The applications 3016 may use built in operating system functions (e.g., kernel 3022, services 3024 and/or drivers 3026), libraries 3020, and frameworks/middleware 3018 to create user interfaces to interact with users of the system. Alternatively, or additionally, in some systems interactions with a user may occur through a presentation layer, such as presentation layer 3014. In these systems, the application/component "logic" can be separated from the aspects of the application/component that interact with a user.

Figure 31:
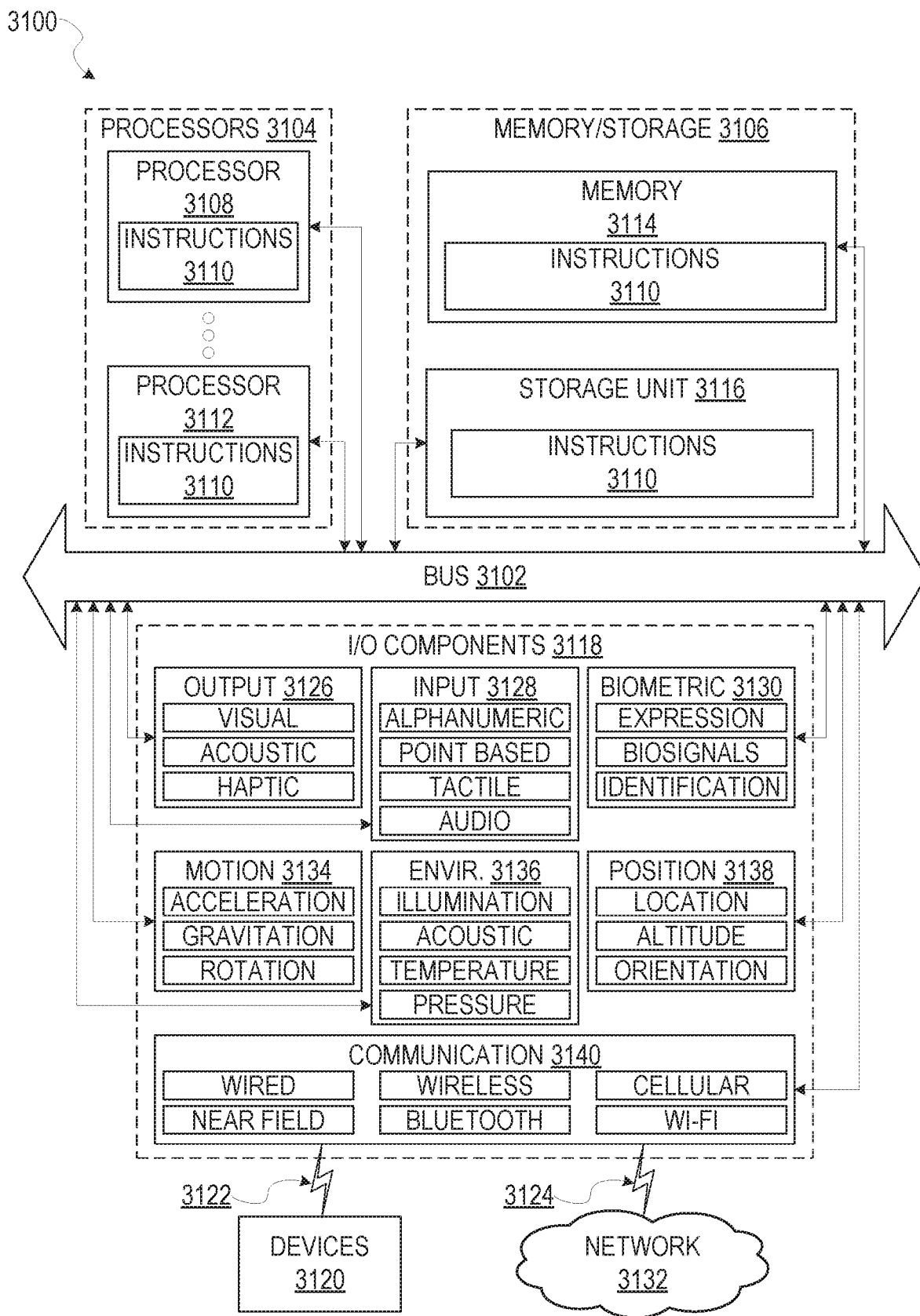
FIG. 31 is a diagrammatic representation of a machine, in the form of a computer system within which a set of instructions may be executed for causing the machine to perform any one or more of the methodologies discussed, in accordance with some example embodiments.

FIG. 31 is a block diagram illustrating components of a machine 3100, according to some example embodiments, able to read instructions from a machine-readable medium (e.g., a machine-readable storage medium) and perform any one or more of the methodologies discussed herein. Specifically, FIG. 31 shows a diagrammatic representation of the machine 3100 in the example form of a computer system, within which instructions 3110 (e.g., software, a program, an application, an applet, an app, or other executable code) for causing the machine 3100 to perform any one or more of the methodologies discussed herein may be executed. As such, the instructions 3110 may be used to implement modules or components described herein. The instructions 3110 transform the general, non-programmed machine 3100 into a particular machine 3100 programmed to carry out the described and illustrated functions in the manner described. In alternative embodiments, the machine 3100 operates as a standalone device or may be coupled (e.g., networked) to other machines. In a networked deployment, the machine 3100 may operate in the capacity of a server machine or a client machine in a server-client network environment, or as a peer machine in a peer-to-peer (or distributed) network environment. The machine 3100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3110, sequentially or otherwise, that specify actions to be taken by machine 3100. Further, while only a single machine 3100 is illustrated, the term "machine" shall also be taken to include a collection of machines that individually or jointly execute the instructions 3110 to perform any one or more of the methodologies discussed herein.

The machine 3100 may include processors 3104, memory/storage 3106, and I/O components 3118, which may be configured to communicate with each other such as via a bus 3102. The memory/storage 3106 may include a memory 3114, such as a main memory, or other memory storage, and a storage unit 3116, both accessible to the processors 3104 such as via the bus 3102. The storage unit 3116 and memory 3114 store the instructions 3110 embodying any one or more of the methodologies or functions described herein. The instructions 3110 may also reside, completely or partially, within the memory 3114, within the storage unit 3116, within at least one of the processors 3104 (e.g., within the processor's cache memory), or any suitable combination thereof, during execution thereof by the machine 3100. Accordingly, the memory 3114, the storage unit 3116, and the memory of processors 3104 are examples of machine-readable media.

The I/O components 3118 may include a wide variety of components to receive input, provide output, produce output, transmit information, exchange information, capture measurements, and so on. The specific I/O components 3118 that are included in a particular machine 3100 will depend on the type of machine. For example, portable machines such as mobile phones will likely include a touch input device or other such input mechanisms, while a headless server machine will likely not include such a touch input device. It will be appreciated that the I/O components 3118 may include many other components that are not shown in FIG. 31. The I/O components 3118 are grouped according to functionality merely for simplifying the following discussion and the grouping is in no way limiting. In various example embodiments, the I/O components 3118 may include output components 3126 and input components 3128. The output components 3126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 3128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 3118 may include biometric components 3130, motion components 3134, environmental components 3136, or position components 3138 among a wide array of other components. For example, the biometric components 3130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 3134 may include acceleration sensor components (e.g., accelerometer), gravitation sensor components, rotation sensor components (e.g., gyroscope), and so forth. The environmental components 3136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 3138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3118 may include communication components 3140 operable to couple the machine 3100 to a network 3132 or devices 3120 via coupling 3124 and coupling 3122, respectively. For example, the communication components 3140 may include a network interface component or other suitable device to interface with the network 3132. In further examples, communication components 3140 may include wired communication components, wireless communication components, cellular communication components. Near Field Communication (NFC) components. Bluetooth® components (e.g., Bluetooth® Low Energy). Wi-Fi® components, and other communication components to provide communication via other modalities. The devices 3120 may be another machine or any of a wide variety of peripheral devices (e.g., a peripheral device coupled via a USB).

Moreover, the communication components 3140 may detect identifiers or include components operable to detect identifiers. For example, the communication components 3140 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3140, such as, location via Internet Protocol (IP) geo-location, location via Wi-Fi® signal triangulation, location via detecting a NFC beacon signal that may indicate a particular location, and so forth.

The following discussion relates to various terms or phrases that are mentioned throughout the subject disclosure.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology. General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM). FPGA, and flash memory devices; magnetic disks such as internal hard disks and removable disks; magneto-optical disks; and CD-ROM and DVD-ROM disks The terms "machine-storage medium." "device-storage medium," "computer-storage medium" mean the same thing and may be used interchangeably in this disclosure. The terms "machine-storage media," "computer-storage media." and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an "electronic device." "Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
    retrieving, from a storage device by a client device, first image data previously captured by the client device;
    identifying, based on the first image data, a target facial feature;
    detecting a selection of a first image processing operation to modify the target facial feature with a first media overlay;

performing the first image processing operation on the first image data to generate second image data, the second image data including a modified target facial feature;

detecting a selection of a second image processing operation to modify the second image data with a second media overlay;

performing the second image processing operation on the second image data to generate third image data, the third image data including the modified target facial feature and the second media overlay; and generating a message comprising the third image data.

2. The method of claim 1, wherein the first image processing operation corresponds to a first media overlay and the second image processing operation corresponds to a second media overlay in a messaging system, wherein the first image processing operation is performed by a first layer of a graphical processing pipeline and the second image processing operation is performed by a second layer of the graphical processing pipeline, wherein the second layer is executed after the first layer, wherein the graphical processing pipeline is provided by a graphics processing unit (GPU) of the client device.

3. The method of claim 1, further comprising:
performing the second image processing operation on the first image data to generate fourth image data.

4. The method of claim 3, further comprising:
generating composite image data based on a combination of the fourth image data and the second image data.

5. The method of claim 1, further comprising:
sending, to a server, the message for sharing with one or more other client devices.

6. The method of claim 1, wherein the first image processing operation corresponds to a first media overlay and the first media overlay is associated with a particular group of media overlays based on a category associated with each of the media overlays.

7. The method of claim 6, wherein the second image processing operation corresponds to a second media overlay and the second media overlay is associated with a second group of second media overlays based on a different category associated with the second media overlay.

8. The method of claim 1, further comprising:
rendering, for display by the client device, the third image data.

9. A system comprising:
a processor;
a memory including instructions that, when executed by the processor, cause the processor to perform operations comprising:
retrieving, from a storage device by a client device, first image data previously captured by the client device;
identifying, based on the first image data, a target facial feature;
detecting a selection of a first image processing operation to modify the target facial feature with a first media overlay;
performing the first image processing operation on the first image data to generate second image data, the second image data including a modified target facial feature;
detecting a selection of a second image processing operation to modify the second image data with a second media overlay;
performing the second image processing operation on the second image data to generate third image data, the third image data including the modified target facial feature and the second media overlay; and
generating a message comprising the third image data.

10. The system of claim 9, wherein the first image processing operation corresponds to a first media overlay and the second image processing operation corresponds to a second media overlay in a messaging system, wherein the first image processing operation is performed by a first layer of a graphical processing pipeline and the second image processing operation is performed by a second layer of the graphical processing pipeline, wherein the second layer is executed after the first layer, wherein the graphical processing pipeline is provided by a graphics processing unit (GPU) of the client device.

11. The system of claim 9, wherein the memory includes further instructions, which further cause the processor to perform further operations comprising:
performing the second image processing operation on the first image data to generate fourth image data.

12. The system of claim 11, wherein the memory includes further instructions, which further cause the processor to perform further operations comprising:
generating composite image data based on a combination of the fourth image data and the second image data.

13. The system of claim 9, wherein the memory includes further instructions, which further cause the processor to perform further operations comprising:
sending, to a server, the message for sharing with one or more other client devices.

14. The system of claim 9, wherein the first image processing operation corresponds to a first media overlay and the first media overlay is associated with a particular group of media overlays based on a category associated with each of the media overlays.

15. The system of claim 14, wherein the second image processing operation corresponds to a second media overlay and the second media overlay is associated with a second group of second media overlays based on a different category associated with the second media overlay.

16. A non-transitory computer-readable medium comprising instructions, which when executed by a computing device, cause the computing device to perform operations comprising:
retrieve, by a client device, first image data from a storage device, the first image data being captured by the client device at a previous time;
identifying, based on the first image data, a target facial feature;
detecting a selection of a first image processing operation to modify the target facial feature with a first media overlay;
performing the first image processing operation on the first image data to generate second image data, the second image data including a modified target facial feature;
detecting a selection of a second image processing operation to modify the second image data with a second media overlay;
performing the second image processing operation on the second image data to generate third image data, the third image data including the modified target facial feature and the second media overlay; and
generating a message comprising the third image data.

* * * * *

UNITED STATES PATENT AND TRADEMARK OFFICE
CERTIFICATE OF CORRECTION

PATENT NO. : 11,164,353 B2  
APPLICATION NO. : 16/732051  
DATED : November 2, 2021  
INVENTOR(S) : Luo et al.

Page 1 of 1

It is certified that error appears in the above-identified patent and that said Letters Patent is hereby corrected as shown below:

On the Title Page

On page 2, in Column 1, under "Other Publications", Line 8, delete "May 7, 2021"," and insert --Jan. 7, 2021",-- therefor On page 2, in Column 1, under "Other Publications", Line 14, after "11 pgs.", insert a linebreak and --"U.S. Appl. No. 16/732,001, Supplemental Notice of Allowability dated Jun. 16, 2021", 2 pgs.
"International Application Serial No. PCT/US2020/070923, International Search Report dated May 28, 2021", 5 pgs.
"International Application Serial No. PCT/US2020/070923, Written Opinion dated May 28, 2021", 10 pgs.
"U.S. Appl. No. 16/732,025, Response filed Jun. 22, 2021 to Non Final Office Action dated Mar. 22, 2021", 11 pgs.
"U.S. Appl. No. 16/732,025, Examiner Interview Summary dated Jun. 24, 2021", 2 pgs.--

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*